United States Patent [19]

Nishida et al.

[11] Patent Number: 5,319,456
[45] Date of Patent: Jun. 7, 1994

[54] MOVING VECTOR DETECTING APPARATUS

[75] Inventors: Yoshihiro Nishida; Shigeki Tsuji, both of Nagaokakyo, Japan

[73] Assignee: Mitsubishi Denki Kabushiki Kaisha, Tokyo, Japan

[21] Appl. No.: 893,143

[22] Filed: Jun. 3, 1992

Related U.S. Application Data

[63] Continuation-in-part of Ser. No. 758,546, Sep. 1, 1991, Pat. No. 5,189,518.

[30] Foreign Application Priority Data

Jun. 3, 1991 [JP] Japan .................. 3-131214
Jun. 13, 1991 [JP] Japan .................. 3-141979
Sep. 17, 1991 [JP] Japan .................. 3-235957

[51] Int. Cl.$^5$ .................................. H04N 5/232
[52] U.S. Cl. .................................. 348/699; 348/208
[58] Field of Search .................. 358/222, 105, 136; H04N 5/232

[56] References Cited

U.S. PATENT DOCUMENTS 5,184,216 2/1993 Kobayashi .................... 358/105
5,189,513 2/1993 Sekine ...................... 358/105

FOREIGN PATENT DOCUMENTS 64-10787 1/1989 Japan .
2241187 9/1990 Japan .
364279 3/1991 Japan .

*Primary Examiner*—Howard W. Britton

[57] ABSTRACT

A moving vector detecting apparatus includes a horizontal low-pass filter for extracting a low-pass component in a horizontal direction of an input image signal; a first moving vector detector for detecting a moving vector in a vertical direction of an image, by an inter-frame correlation between a representative point and a pixel on a vertical straight line through the representative point, from the output signal of the horizontal low-pass filter; a vertical low-pass filter for extracting a low-pass component of an input image signal in a vertical direction; and a second moving vector detector for detecting a moving vector in a horizontal direction of the image, by an inter-frame correlation between the representative point and a pixel on a horizontal straight line through the representative point, from the output signal of the vertical low-pass filter. Therefore, the horizontal component of the moving vector is detected from the signal component having a high vertical correlation and the vertical component of the moving vector is detected from the signal component having a high horizontal correlation both by the one-dimensional moving vector detector, with the result that the moving vector can be detected with a few accumulated addition tables in short calculating time.

60 Claims, 25 Drawing Sheets (a)

(b)

(a) y=y₁ plane (b) y=0 plane (a)

$x = x_1$ plane (b)

$x = 0$ plane (a)

(b)

x = m section
(m = x₁)

(c)

y = n section
(n = y₁)

MOVING VECTOR DETECTING APPARATUS

This application is a continuation-in-part application of application Ser. No. 07/758,546 filed on Sep. 9, 1991, now U.S. Pat. No. 5,189,518.

FIELD OF THE INVENTION

The present invention relates to a moving vector detecting apparatus for extracting a movement of an image from an image signal, which is used for correcting an image blur in an imaging apparatus such as a small-sized and light-weight video camera, such as a portable video camera.

BACKGROUND OF THE INVENTION

In order to detect an amount of movement of the image between frames, it is ideal to calculate how far and which direction each pixel in the image moved and this method ensures the best precision in vector detection. However, this method requires large-scale hardware and takes a lot of time, so that it is difficult to realize the above method. Thus, there is a general method for determining the moving vector in the whole screen by finding an amount of movement of several pixels (referred to as representative points hereinafter) in the screen.

FIG. 20 is a diagram showing a general representative point calculating circuit. FIG. 21 is a diagram showing the relation between block and the representative point in the image according to the conventional example of FIG. 20. The image of one field is divided into the prescribed number of blocks 901 and one representative point $R_{ij}$ 902 is provided in the center of each block. The level difference between the representative point in the previous frame and the whole pixels $P_{ij}(x,y)$ 903 in the block is calculated in each block.

In FIG. 20, an input video signal (a) is A/D converted by the A/D converter 1. Then, the video signal converted to a digital signal by the A/D converter 1 is calculated as follows. A calculation according to the pixel in the block 901 will be described as an example. A prescribed pixel to become the representative point 902 in the block 901 is written in a prescribed region of a representative point memory 802 through a latch circuit 801. Data stored in the representative point memory 802 is read one frame later and applied to a difference absolute value calculating circuit 805 through a latch circuit 803. On the other hand, the other A/D converted data of the video signal is applied to the difference absolute value calculating circuit 805 through a latch circuit 804. The absolute value of the difference between the representative point signal (f) of the previous frame output from the latch circuit 803 and the pixel signal (g) of the present frame output from the latch circuit 804 is calculated by the difference absolute value calculating circuit 805. These calculations are per-formed in each block and an output signal (h) from the difference absolute value calculating circuit 805 is added one after another to tables corresponding to the same address of the pixel in each block of the accumulated addition table 806. The result of the addition in the tables is input to a table value comparator 807 and finally it is determined how far and which direction the image position moved for one frame, that is, a moving vector value (i) is determined from a block address in which the result of the addition is the minimum.

More specifically, the absolute value of the difference between the representative point $R_{ij}$ and a signal $S_{ij}(x,y)$ positioned in a horizontal direction x and a vertical direction y is found and then it is added to x and y of the same position to each representative point and then it is set as an accumulated addition table $D_{xy}$, $D_{xy}$ is represented as follows;

$$D_{xy} = \Sigma |R_{ij} - S_{ij}(x,y)|$$

Then, the minimum x and y in the $D_{xy}$ are set as moving vectors in the horizontal direction and in the vertical direction, respectively.

In the above structure, however, since the moving vector is found in a plane manner, i.e., two dimensionally, the accumulated addition tables whose number corresponds to the number of whole pixels in the block are required. For example, if the number of the pixels are 32 in the horizontal direction and 16 in the vertical direction, 512 ($=32 \times 16$) accumulated addition tables are required, with the result that the scale of the circuit is increased. In addition, when the moving vector is calculated, all the data in the accumulated addition tables is compared, with the result that the number of comparisons is very large and also it takes a lot of time.

Meanwhile, inventors of the present invention propose an improved moving vector detecting apparatus in Japanese Patent Published Application No. 1-277539, in which two intersecting one-dimensional moving vectors are obtained from an accumulated addition table corresponding to a pixel on a vertical straight line passing through a representative point and an accumulated addition table corresponding to a pixel on a horizontal straight line passing through the representative point and a two-dimensional moving vector is calculated from these two intersecting one-dimensional moving vectors.

FIG. 22 is a block diagram showing the moving vector detecting apparatus for determining a vector on the screen by detecting two intersecting one-dimensional moving vectors, disclosed in the Japanese Patent Published Application No. 1-277539. In FIG. 22, an input video signal (a) is A/D converted by an A/D converter 1 and then a prescribed pixel in the block 2020 (shown in FIG. 23) to become the representative point 2021 is written in a representative point memory 813 through a latch circuit 812. The data stored in the representative point memory 813 is read one frame after and then applied to a vertical absolute value circuit 819 and a horizontal absolute value circuit 820 through a latch circuit 814. On the other hand, the data of the A/D converted video signal is applied to the the vertical absolute value circuit 819 through a vertical pixel latch circuit 816 which latches at a timing corresponding to the pixel in the vertical direction of the representative point and also applied to the horizontal absolute value circuit 820 through a horizontal pixel latch circuit 818 which latches at a timing corresponding to the pixel in the horizontal direction of the representative point. A representative point signal (c) in the previous frame which is output from the latch circuit 814 and a pixel signal (d) in the present frame which is output from the vertical pixel latch circuit 816 are calculated at the vertical absolute value circuit 819 to find the absolute value of the difference between them. The representative point signal (c) in the previous frame which is output from the latch circuit 814 and a pixel signal (e) in the present frame which is output from the horizontal pixel latch circuit 818 are calculated at the horizontal absolute value circuit 820 to find the absolute value of the difference between them. These calculations are performed every block and an output signal (f) from the vertical absolute value circuit 819 is added one after another to tables corresponding to the same address of the pixel in each block in the vertical accumulated addition table 821 and an output signal (g) from the horizontal absolute value circuit 820 is added one after another to tables corresponding to the same address of the pixel in each block in the horizontal accumulated addition table 822. The result of the horizontal accumulated addition table 822 and the result of the vertical accumulated addition table 821 are input to the one-dimensional vector detecting means 823 and then a vertical moving vector (h) and a horizontal moving vector (i) are detected therein. The vertical moving vector (h) and the horizontal moving vector (i) thus obtained, which are two intersecting one-dimensional vectors, are input to two-dimensional vector calculating means 824 and then it is found how far and in which direction the image position moved for one frame at the final stage, i.e., a two-dimensional moving vector value (j) is determined.

FIG. 23 is a view showing the relation between the block and the representative point of the image according to FIG. 22. The image of one field is divided into prescribed number of blocks 2020 and one representative point $R_{ij}$ 2021 is provided at the center of each block. The level difference between the representative point in the previous frame and a pixel $S_{ij}(0,y)$ 2070 in the vertical direction of the representative point and a pixel $S_{ij}(x,0)$ 2071 in the horizontal direction of the representative point in the block is calculated every block and then the level difference is added one after another to tables corresponding to the same address of the pixel in each block. It is found that how far and which direction the image position moved in the vertical and horizontal directions for one frame by a block address in which the addition result is the minimum in each area, i.e., the vertical moving vector value (h) and the horizontal moving vector value (i) are determined.

More specifically, a vertical accumulated addition table $D_y$ is obtained by finding the absolute value of the difference between the representative point $R_{ij}$ and a signal $S_{ij}(0,y)$ positioned apart from that in the vertical direction by y and adding the same over those at the same position y relation with respect to each representative point, and a horizontal accumulated addition table $D_X$ is obtained by finding the absolute value of the difference between the representative point $R_{ij}$ and a signal $S_{ij}(x,0)$ positioned apart from that in the horizontal direction by x and adding the same over those at the same position x relation with respect to each representative point. At this time, they are represented by the following equations, that is;

$$D_X = \Sigma |R_{ij} - S_{ij}(x,0)|$$

$$D_Y = \Sigma |R_{ij} - S_{ij}(0,y)|$$

Then, the minimum x and y in the $D_x$ and $D_y$ are set as the horizontal moving vector (i) and the vertical moving vector (h), respectively.

A description is given of the detecting precision in detecting two intersecting one-dimensional moving vectors from the vertical accumulated addition table and the horizontal accumulated addition table.

Generally, an auto-correlation function of an image has a statistical characteristic to be approximated by Laplace distribution (negative exponential function). However, for simplification, it is supposed that the correlation decreases in proportion to the distance, both in the horizontal and vertical directions, in the following description.

FIGS. 24(a)-(c) show a case where the image is at a standstill and FIGS. 25(a)-(c) show a case where the image moves in a diagonal direction. FIGS. 24(a) and 25(a) show the accumulated addition table corresponding to the whole number of pixels in the block in which a horizontal direction (x), a vertical direction (y) and a value of the accumulated addition table (z) are represented by three dimensions with the representative point as the origin. In addition, FIGS. 24(b) and 25(b) show the vertical accumulated addition table $D_Y$ obtained by finding the absolute value of the difference between the representative point $R_{ij}$ and a signal $S_{ij}(0,y)$ positioned in the vertical direction y thereof and adding the same over those at the same position y relation with respect to each representative point, in which the vertical direction (y) and the value of the accumulated addition table (z) are represented by two dimensions with the representative point as the origin. FIGS. 24(c) and 25(c) show the horizontal accumulated addition table $D_X$ obtained by finding the absolute value of the difference between the representative point $R_{ij}$ and a signal $S_{ij}(x,0)$ positioned in the vertical direction x thereof and adding the same over those at the same position x relation with respect to each representative point, in which the horizontal direction (x) and the value of the accumulated addition table (z) are represented by two dimensions with the representative point as the origin.

When the image is at a standstill, the accumulated addition table value is in the form of an inverted cone with the origin (0,0,0) as an apex as shown in FIG. 24(a). At this time, the value of the vertical accumulated addition table shown in FIG. 24(b) is the minimum when y=0 and the horizontal accumulated addition table shown in FIG. 24(c) is the minimum when x=0. Therefore, it is found that the vertical moving vector and the horizontal moving vectors are both 0 vector.

If the picture moves largely by $x_1$ in the horizontal direction and slightly by $y_1$ in the vertical direction for one frame, the accumulated addition table is in the form of the inverted cone with $(x_1,y_1,0)$ as an apex as shown in FIG. 25(a). At this time, the vertical accumulated addition table is the value of a section of the cone at the plane of x=0 as shown in FIG. 25(b) and the horizontal accumulated addition table is the value of a section of the cone at the plane of y=0 as shown in FIG. 25(c). Then, as can be seen from FIG. 25(b), the value of the vertical accumulated addition table is the minimum when $y=y_1$. Also, as can be seen from FIG. 25(c), the value of the horizontal accumulated addition table is the minimum when $x=x_1$. Accordingly, it is found that the vertical moving vector (h) is $(0,y_1)$ and the horizontal moving vector (i) is $(x_1,0)$. However, because of the difference in amount of movement between the horizontal direction and the vertical direction, a steep hyperbolic curve is shown in FIG. 25(c) while a gentle hyperbolic curve is shown in FIG. 25(b).

In case of an actual horizontal accumulated addition table, an error of $\Delta z$ in the direction of z exists because of a quantization error, an round-off error, a difference in horizontal correlation level of the image, a local movement or the like. Therefore, although detecting precision is high in the case of the steep hyperbolic curve shown in FIG. 25(c), it is low in the case of the gentle hyperbolic curve shown in FIG. 25(b).

As described above, when the moving vector is found in a plane manner, i.e., two-dimensionally, the number of the accumulated addition tables increases, with the result that the scale of the circuit is increased and the calculation takes a lot of time. In addition, in the case where two intersecting one-dimensional moving vectors are detected from the accumulated addition table corresponding to the pixel on a vertical straight line passing through the representative point and the accumulated addition table corresponding to the pixel on a horizontal straight line passing through the representative point, if the vector moves largely toward either axis, the moving vector detecting precision at the other axis is deteriorated.

SUMMARY OF THE INVENTION

It is an object of the present invention to provide a moving vector detecting apparatus in which the scale of the circuit is decreased, the calculation time is reduced, and the detecting precision is not poor even when the image moves a great deal.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a first aspect of the present invention, a moving vector detecting apparatus includes a horizontal low-pass filter for extracting a low-pass component in a horizontal direction of an input image signal; first moving vector detecting means for detecting a moving vector in a vertical direction of an image, by an inter-frame correlation between a representative point and a pixel on a vertical straight line through the representative point, from the output signal of the horizontal low-pass filter; a vertical low-pass filter for extracting a low-pass component of an input image signal in a vertical direction; and second moving vector detecting means for detecting a moving vector in a horizontal direction of the image, by an inter-frame correlation between the representative point and a pixel on a horizontal straight line through the representative point, from the output signal of the vertical low-pass filter. In this moving vector detecting apparatus, the horizontal component of the moving vector is obtained from the signal component having a high vertical correlation while the vertical component of the moving vector is obtained from the signal component having a high horizontal correlation, both by the one-dimensional moving vector detecting means. Therefore, the number of the accumulated addition tables is equal to the sum of the number of the horizontal pixels and the number of the vertical pixels, so that the moving vector can be detected with a small-scale circuit in a short calculating time. For example, if the number of the pixels in one block is 32 in the horizontal direction and 16 in the vertical direction, 48 (=32+16) accumulated addition tables are necessary, with the result that the accumulated addition tables can be realized with the scale of the circuit reduced to one tenth or less of the conventional one. In addition, the decrease in the accumulated addition tables results in a reduction in the moving vector calculating time.

According to a second aspect of the present invention, a moving vector detecting apparatus includes a vertical correlation detecting means for detecting a correlation in a vertical direction in each block of a video signal, a first moving vector detecting means for detecting a moving vector in a horizontal direction of the video signal from a block which is judged to have a high vertical correlation by the vertical correlation detecting means, a horizontal correlation detecting means for detecting a correlation in a horizontal direction in each block of the video signal, and a second moving vector detecting means for detecting a moving vector in a vertical direction of the video signal from a block which is judged to have a high horizontal correlation by the horizontal correlation detecting means. In this moving vector detecting apparatus, the horizontal component of the moving vector is obtained from the video signal in the block having a high vertical correlation and the vertical component of the moving vector is obtained from the video signal in the block having a high horizontal correlation, both by the one-dimensional moving vector detecting means. Therefore, the number of the accumulated addition tables is equal to the sum of the number of the horizontal pixels and the number of the vertical pixels, so that the detection of the moving vector can be performed with a small circuit in a short time. For example, if the number of the pixels in one block is 32 in the horizontal direction and 16 in the vertical direction, 48 (=32+16) accumulated addition tables are necessary, with the result that the accumulated addition tables can be realized with the scale of the circuit reduced to one tenth or less of the conventional one. In addition, the decrease in the accumulated addition tables results in a reduction in the moving vector calculating time.

According to a third aspect of the present invention, a moving vector detecting apparatus includes a means for varying the timing of sampling for detecting two intersecting one-dimensional moving vectors with respect to the position of the representative point. In addition, the timing of sampling for detecting a horizontal moving vector is obtained by that the position of the representative point is offset by the vertical moving vector detected by the previous detection. In addition, the timing of sampling for detecting a vertical moving vector is obtained by that the position of the representative point is offset by the horizontal moving vector detected by the previous detection. In this apparatus, two intersecting one-dimensional vectors are detected from an accumulated addition table corresponding to a pixel on a vertical straight line passing through a point which gives an offset of (m,0) to the representative point and an accumulated addition table corresponding to a pixel on a horizontal straight line passing through a point which gives an offset of (0,n) to the representative point.

In accordance with a fourth aspect of the present invention, a moving vector detecting apparatus includes a moving vector predicting means for predicting the present vertical and horizontal moving vectors from vertical and horizontal moving vectors which have previously been detected. The horizontal moving vector is obtained by calculating a pixel on a horizontal straight line passing through a point which gives an offset of the predicted vertical moving vector to the representative point while the vertical moving vector is obtained by calculating a pixel on a vertical straight line passing through a point which gives an offset of the predicted horizontal moving vector to the representative point. In addition, when the previously detected moving vectors have numerous high frequency components higher than a prescribed frequency, a value obtained by averaging the previously detected moving vectors in point of time is the predicted moving vector. On the other hand, when the previously detected moving vectors have numerous low frequency components lower than the prescribed frequency, a value obtained by a secondary difference prediction is the predicted moving vector. In this apparatus, two intersecting one-dimensional vectors are detected from an accumulated addition table corresponding to the pixel in the vertical direction of the point which gives an offset of the predicted horizontal moving vector (m,0) to the representative point and an accumulated addition table corresponding to the pixel in the horizontal direction of the point which gives an offset of the predicted vertical moving vector (0,n). In addition, the moving vector is precisely predicted in both cases where the actual moving vector has the low frequency components and where it has the high frequency components.

BRIEF DESCRIPTION OF THE DRAWINGS

FIGS. 24 and 24(a)-24(c) are schematic diagrams showing accumulated addition tables in three-dimension and in two-dimension at a standstill in the conventional moving vector detecting apparatus which detects a moving vector from two intersecting one-dimensional moving vectors; and FIGS. 25 and 25(a)-25(c) are schematic diagrams showing accumulated addition tables in three-dimension and in two-dimension at the time of moving in diagonal direction in the conventional moving vector detecting apparatus which detects a moving vector from two intersecting one-dimensional moving vectors.

DETAILED DESCRIPTION OF THE PREFERRED EMBODIMENTS

Figure 1:
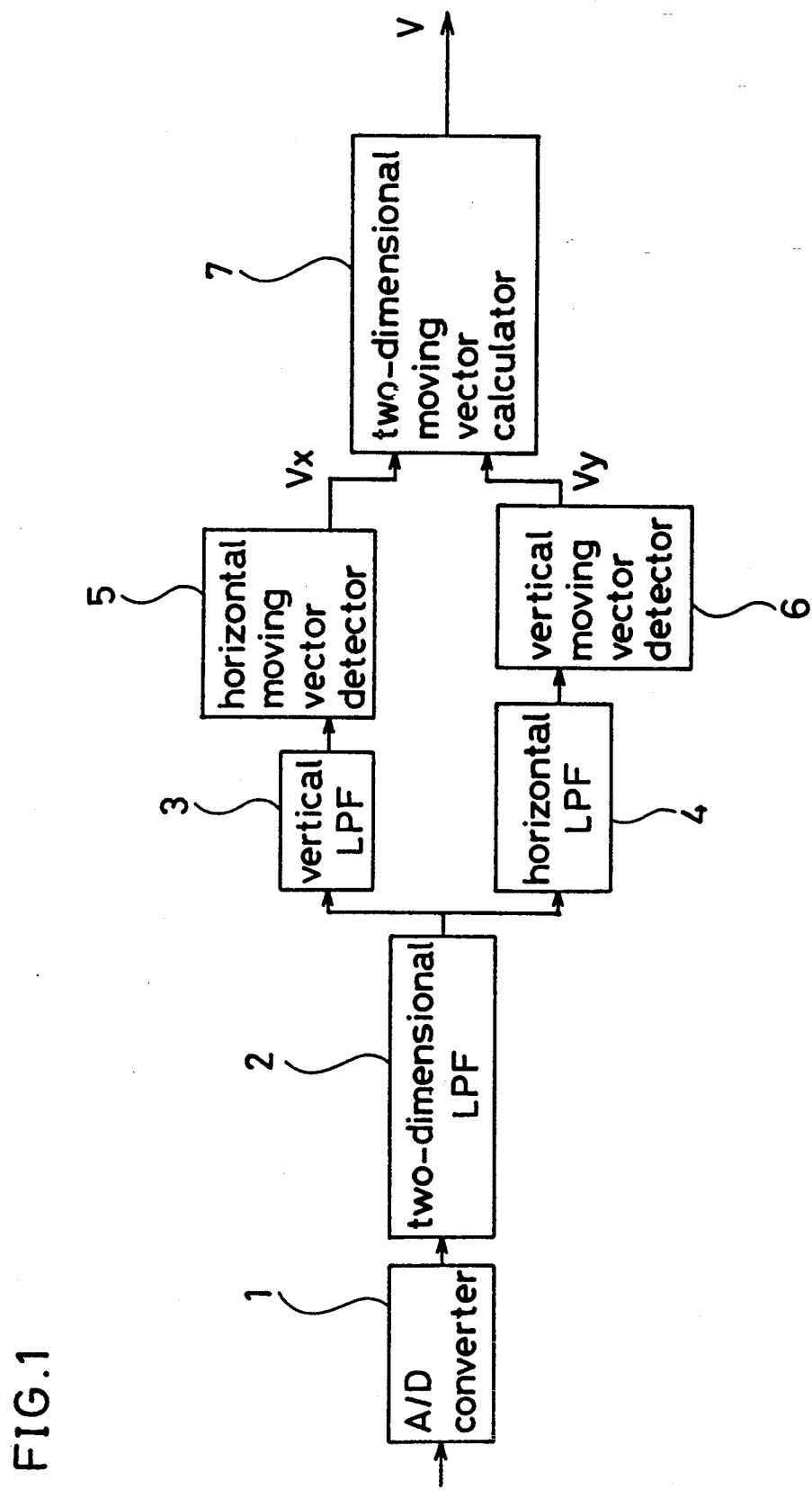
FIG. 1 is a block diagram showing a moving vector detecting apparatus in accordance with a first embodiment of the present invention.
Figure 2:
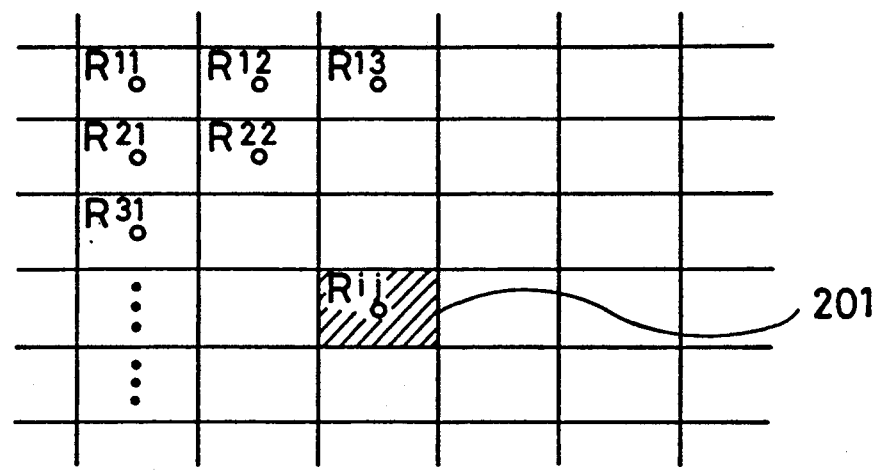
FIG. 2 is a schematic diagram showing a relation between a block and a representative point in an image in a representative point calculation.
Figure 2:
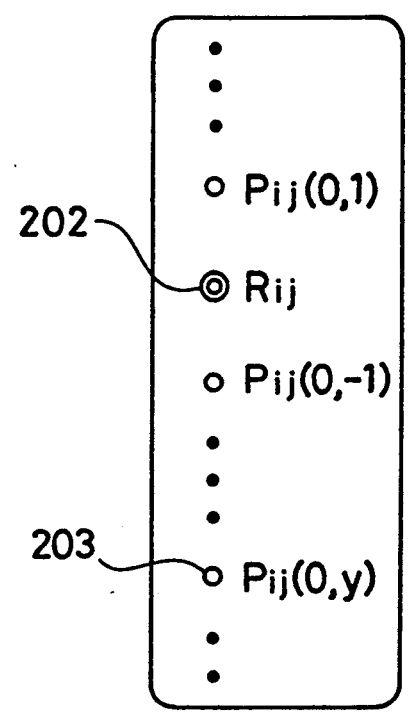
Figure 2:
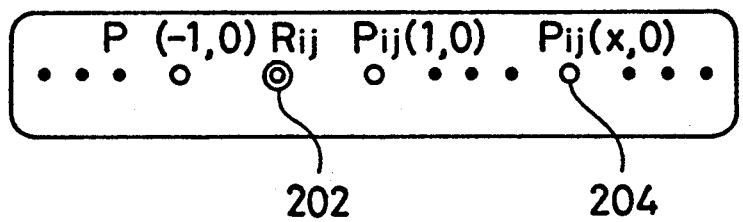
Figure 3:
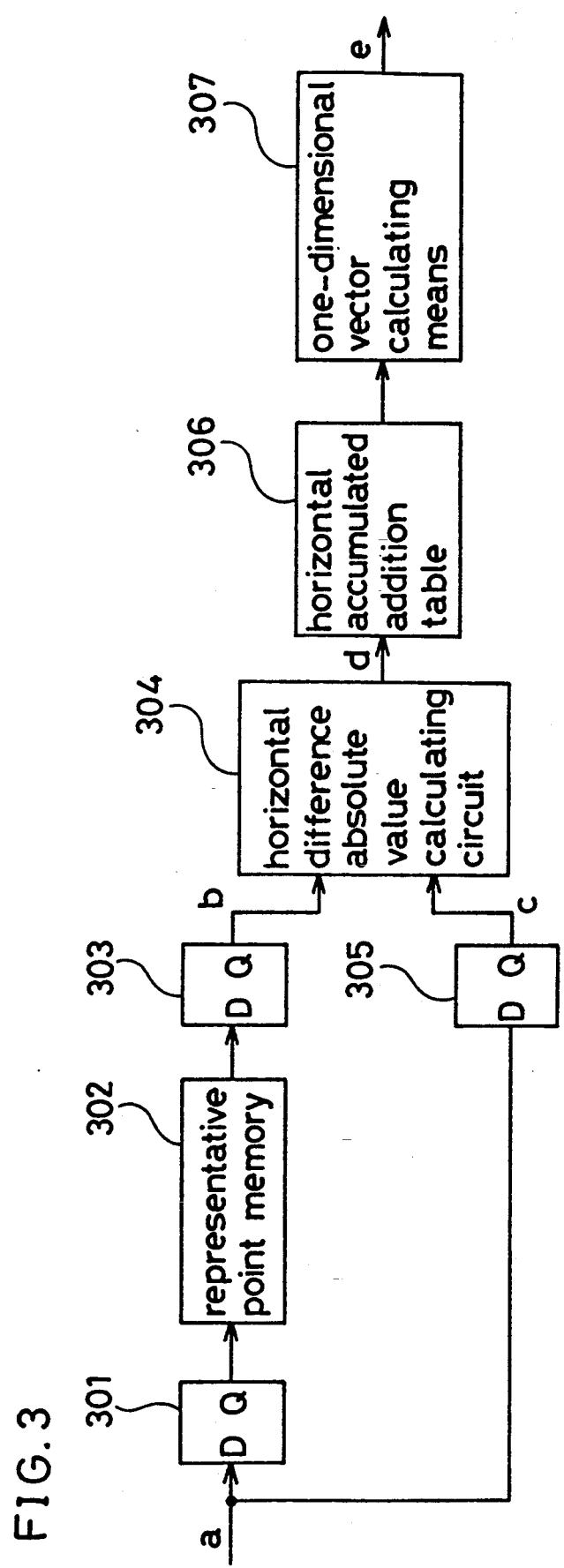
FIG. 3 is a block diagram showing a horizontal moving vector detector shown in FIG. 1.

FIG. 1 is a block diagram showing the whole structure of a moving vector detecting apparatus in accordance with a first embodiment of the present invention. FIG. 2 shows the relation between the block and the representative point of the image in accordance with the embodiment of FIG. 1. FIG. 3 is a block diagram showing a moving vector detector in the horizontal direction. In FIG. 2 the image of one field is divided into the prescribed number of blocks 201 and one representative point $R_{ij}$ 202 is provided in the center of each block. The level differences between the representative point in the previous frame and the pixel $P_{ij}(x,0)$ 204 in the horizontal direction of the representative point and the pixel $P_{ij}(0,y)$ 203 in the vertical direction of the representative point are calculated in each block.

In FIG. 1, an input video signal is A/D converted by the A/D converter 1 and then a high-pass component including a large noise component in the vertical and horizontal directions is eliminated by a two-dimensional low-pass filter 2. An output signal from the two-dimensional low-pass filter 2 is transferred to a vertical low-pass filter 3 and a horizontal low-pass filter 4. Here, vertical cutoff frequency of the vertical low-pass filter 3 is set sufficiently lower than vertical cutoff frequency of the two-dimensional low-pass filter 2 and only the low-pass component in the vertical direction, i.e., the signal component having a high vertical correlation, is passed through. An output from the vertical low-pass filter 3 is transferred to a horizontal moving vector detector 5 and a horizontal moving vector $v_x$ of the input video signal is detected from an inter-frame correlation between the representative point and a pixel in the horizontal direction of the representative point. Similarly, horizontal cutoff frequency of the horizontal low-pass filter 4 is set sufficiently lower than horizontal cutoff frequency of the two-dimensional low-pass filter and only the low-pass component in the horizontal direction, i.e., the signal component having a high horizontal correlation, is passed through. An output from the horizontal low-pass filter 4 is transferred to a vertical moving vector detector 6 and a vertical moving vector $v_y$ of the input video signal is detected from an inter-frame correlation between the representative point and a pixel in the vertical direction of the representative point. The output from the horizontal moving vector detector 5 and the output from the vertical moving vector detector 6 are transferred to a two-dimensional moving vector detector 7. In the two-dimensional moving vector detector 7, a two-dimensional moving vector V is calculated from one-dimensional moving vectors in the horizontal and vertical directions.

FIG. 3 is a block diagram showing a structure of the horizontal moving vector detector. A prescribed pixel to become the representative point in the block among the output signals (a) from the vertical low-pass filter 3 is written in a representative point memory 302 through a latch circuit 301. Data stored in the representative point memory 302 are read one frame after and then transferred to a horizontal difference absolute value calculating circuit 304 through a latch circuit 303. On the other hand, data of an output signal from the vertical low-pass filter 3 are transferred to the horizontal difference absolute value calculating circuit 304 through a horizontal pixel latch circuit 305 which latches at a timing corresponding to a pixel in the horizontal direction of the representative point. An absolute value of the difference between the representative point signal (b) in the previous frame output from the latch circuit 303 and the pixel signal (c) in the present frame output from the horizontal pixel latch circuit 305 is calculated by the horizontal difference absolute value calculation circuit 304. This calculating is performed in each block and an output signal (d) from the horizontal difference absolute value calculating circuit 304 is added one after another to tables corresponding to the same address of the pixel in each block of the horizontal accumulated addition table 306.

At this time, a value $D_x$ of the horizontal accumulated addition table is represented by the following equation, that is;

$$D_x = \Sigma |R_{ij} - P_{ij}(x,0)|$$

The result of the horizontal accumulated addition table 306 is input to the one-dimensional vector detecting means 307 and the address x when the table value $D_x$ of the accumulated addition table 306 is the minimum, i.e., the address x when the inter-frame correlation is the maximum, is detected as a moving vector (e) in the horizontal direction.

A moving vector in the vertical direction can be obtained in the same way as described above. More specifically, an absolute value of the difference between the representative point $R_{ij}$ and the pixel $P_{ij}(0,y)$ in the block in the vertical direction of the representative point in the next frame is detected in each block with respect to the video signal output from the horizontal low-pass filter 4, and the absolute value is added to the vertical accumulated addition table, for the whole blocks, to obtain the table value $D_y = \Sigma |R_{ij} - P_{ij}(0,y)|$. Then, the address y when $D_y$ is the minimum shows the moving vector in the vertical direction.

A description is given of a method for detecting a two-dimensional moving vector from two one-dimensional moving vectors in the horizontal and vertical directions.

Figure 4:
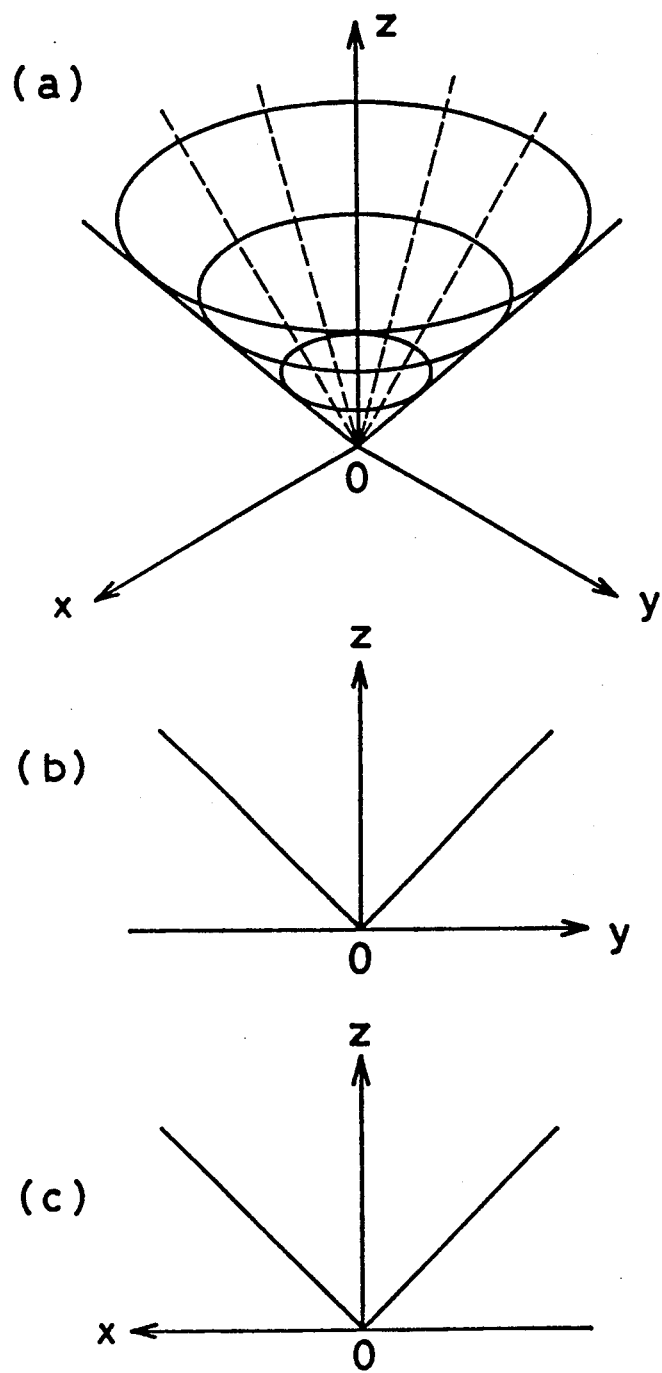
FIGS. 4(a)-4(c) are schematic diagrams showing an accumulated addition table when the image is at a standstill.

FIGS. 4(a)–4(c), 5(a)–5(c), 6(a)–6(b) and 7(a)–7(b) schematically show the accumulated addition tables. FIG. 4(a) shows an accumulated addition table $D_{xy}$ corresponding to the whole number of pixels in the block, in which a horizontal direction (x), a vertical direction (y) and a value of the accumulated addition table (z) are represented by three dimensions with the representative point as the origin. In addition, FIG. 4(b) shows a vertical accumulated addition table $D_y$, in which the vertical direction (y) and the value of the accumulated addition table (z) are represented by two dimensions with the representative point as the origin. FIG. 4(c) shows a horizontal accumulated addition table $D_x$, in which the horizontal direction (x) and the value of the accumulated addition table (z) are represented by two dimensions with the representative point as the origin.

Generally, a correlation between a pixel and a pixel in its vicinity decreases with an increase in the distance therebetween. Accordingly, when the image is at a standstill, a value of the accumulated addition table $D_{xy}$ is in the form of an inverted cone with the origin (0,0,0) as an apex as shown in FIG. 4(a). At this time, a value of the vertical accumulated addition table $D_y$ shown in FIG. 4(b) is the minimum when y=0 and a value of the horizontal accumulated addition table D shown in FIG. 4(c) is the minimum when x=0. Therefore, it is found that the vertical moving vector and the horizontal moving vector are both 0 vectors.

Figure 5:
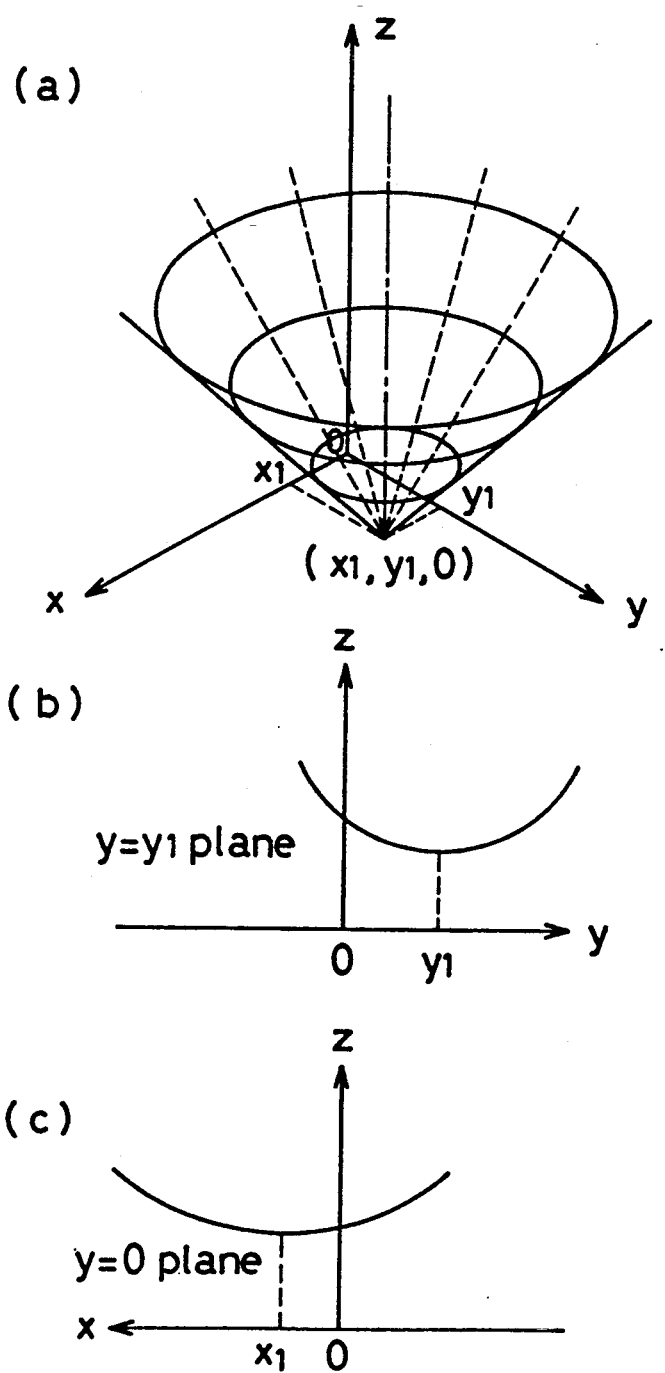
FIGS. 5(a)-5(c) are schematic diagrams showing an accumulated addition table when the image moves.

If the video signal moves by $x_1$ in the horizontal direction and by $y_1$ in the vertical direction for one frame, the accumulated addition table $D_{xy}$ is in the form of the inverted cone with $(x_1,y_1,0)$ as an apex as shown in FIG. 5(a). At this time, the vertical accumulated addition table $D_y$ and the horizontal accumulated addition table $D_x$ are as shown in FIGS. 5(b) and 5(c), respectively. At this time, the vertical accumulated addition table $D_y$ is the value of a cross-section of the cone at a plane of x=0 as shown in FIG. 5(b) and the horizontal accumulated addition table $D_x$ is the value of a cross-section of the cone at a plane of y=0 as shown in FIG. 5(c). As can be seen from FIG. 5(b), the value of the vertical accumulated addition table $D_y$ is the minimum when $y = y_1$. Also, as can be seen from FIG. 5(c), the value of the horizontal accumulated addition table $D_x$ is the minimum when $x = x_1$. Therefore, it is found that the vertical moving vector $v_y$ is $(0, y_1)$ and the horizontal moving vector $v_x$ is $(x_1, 0)$.

Figure 6:
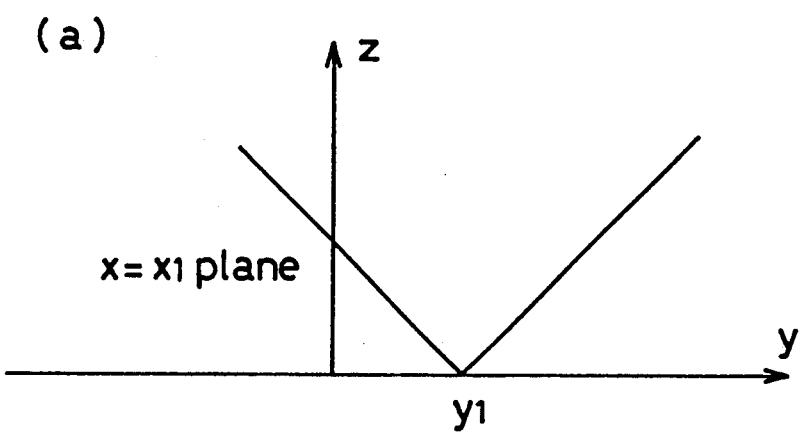
FIGS. 6(a)-6(b) are diagrams showing an example of a vertical accumulated addition table $D_y$ which causes an error detection of a moving vector in the vertical direction.
Figure 6:
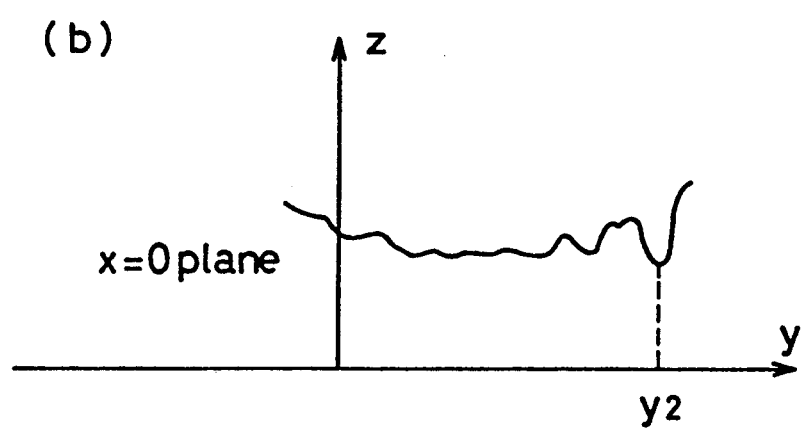

However, when the input video signal has a steep level change, the accumulated addition table value $D_{xy}$ of the image is not in the form of a perfect cone and has a lot of irregularities in some cases. Such irregularities are apt to arise when the number of the blocks in the whole screen, i.e., the total number of the representative points, decreases. Therefore, even when the accumulated addition table $D_{xy}$ at a plane of $x = x_1$ parallel to the accumulated addition table $D_y$ and passing through the apex $(x_1,y_1,0)$ of the cone is like as shown in FIG. 6(a), if the image has a steep change in the horizontal direction, the vertical accumulated addition table $D_y$ apart from that point by $x_1$ in the horizontal direction becomes as shown in FIG. 6(b), resulting in an error detection of the vertical vector. Accordingly, in order to make the y coordinate of the minimum value of the vertical accumulated addition table $D_y$ approximately equal to $y_1$, it is necessary to suppress the steep change in the dispersion of the value of the accumulated addition table $D_{xy}$ at the plane of $x=x_1$ and the dispersion of the value of the vertical accumulated addition table $D_y$ at the plane of $x=0$. When the correlation of the image in the horizontal direction is high, the change of the accumulated addition table value in the horizontal direction is reduced, so that the dispersion of the value of the accumulated addition table $D_{xy}$ at the plane of $x=x_1$ and the dispersion of the value of the vertical accumulated addition table $D_y$ at the plane of $x=0$ do not suddenly change. In the present invention, as a preprocessing of the vertical moving vector detector 6, only the signal component having a high horizontal correlation is extracted by the horizontal low-pass filter 4. Therefore, the change of the value of the accumulated addition table in the horizontal direction is small and then the y coordinate of the minimum value of the accumulated addition table $D_y$ at the plane of $x=0$ is approximately equal to $y_1$, with the result that the error detection is significantly reduced.

Figure 7:
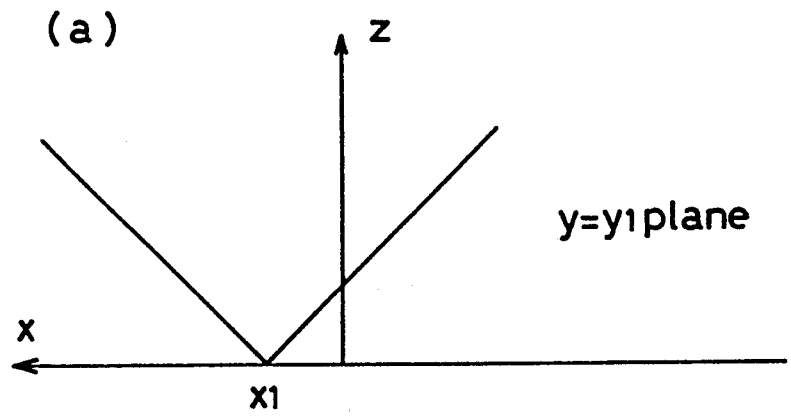
FIGS. 7(a)-7(b) are diagram showing an example of a horizontal accumulated addition table $D_x$ which causes an error detection of a moving vector in the horizontal direction.
Figure 7:
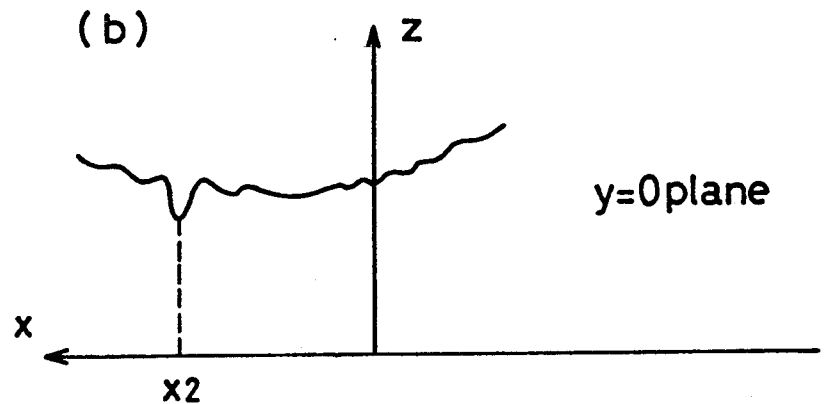

Also in a case of detecting a moving vector in the horizontal direction, even when the accumulated addition table $D_{xy}$ at a plane of $y=y_1$ parallel to the horizontal accumulated addition table $D_x$ and passing through the apex $(x_1,y_1,0)$ of the cone is like as shown in FIG. 7(a), if the image has a steep change in the vertical direction, the horizontal accumulated addition table $D_x$ apart from that point by $y_1$ in the vertical direction becomes as shown in FIG. 8(c), resulting in an error detection of the horizontal moving vector. Accordingly, in order to make the x coordinate of the minimum value of the vertical accumulated addition table $D_x$ approximately equal to the $x_1$, it is necessary to suppress the steep change in the dispersion of the value of the accumulated addition table $D_{xy}$ at the plane of $y=y_1$ and the dispersion of the value of the horizontal accumulated addition table $D_x$ at the plane of $y=0$. When the correlation of the image in the vertical direction is high, the change of the dispersion of the accumulated addition table value in the vertical direction is reduced, so that the dispersion of the value of the accumulated addition table $D_{xy}$ at the plane of $y=y_1$ and the dispersion of the value of the horizontal accumulated addition table $D_x$ at the plane of $y=0$ do not suddenly change. In the present invention, as a preprocessing of the horizontal direction moving vector detector 5, only the signal component having a high vertical correlation is extracted by the vertical low-pass filter 3. Therefore, the change of the accumulated addition table in the vertical direction is small and then the x coordinate of the minimum value of the horizontal accumulated addition table $D_x$ at the plane of $y=0$ is approximately equal to $x_1$, with the result that the error detection is significantly reduced.

Thus, the correlation between the representative point and a pixel on a point, at which the x axis and the y axis intersect, is found, whereby the vertical component and the horizontal component of the two-dimensional moving vector can be obtained.

The moving vector horizontal component $v_x$ and the moving vector vertical component $v_y$, i.e., two intersecting one-dimensional vectors, are input to the two-dimensional vector calculating means 7 and then it is found how far and in which-direction the image position moved for one frame at a final state, i.e., the two-dimensional vector value V is found.

While in the above-described embodiment moving vectors between the frames of the image are detected, the present invention may be used for detecting moving vectors between fields or other time intervals.

While in the above-described embodiment the two-dimensional low-pass filter 2 is provided, this may be dispensed with. However, the two-dimensional low-pass filter eliminates high-pass component including a lot of noise component from the video signal which is digitally converted, thereby further enhancing the detecting precision.

Figure 8:
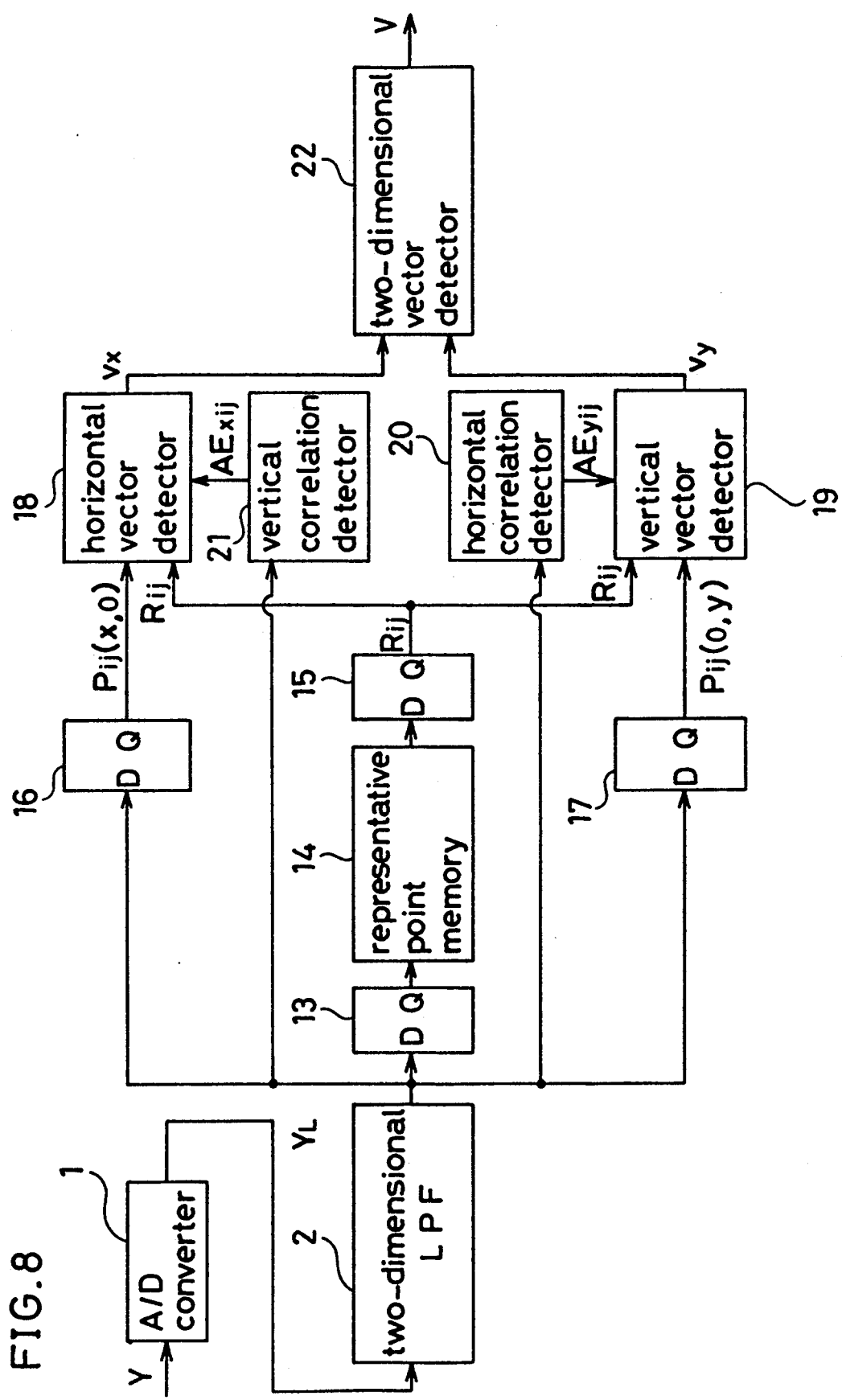
FIG. 8 is a block diagram showing a moving vector detecting apparatus in accordance with a second embodiment of the present invention.

FIG. 8 is a block diagram showing a moving vector detecting apparatus in accordance with a second embodiment of the present invention. The relationship between the block and the representative point of the image in accordance with the embodiment of FIG. 8 is illustrated in FIG. 2.

In FIG. 8, an input video signal is A/D converted by the A/D converter 1 and then high-pass component including a large noise component in the vertical and horizontal directions is eliminated by a two-dimensional low-pass filter 2. An output signal $Y_L$ from the two-dimensional low-pass filter 2 is written in a representative point memory 14 by that a prescribed pixel to become a representative point in the block 201 passes through the input side representative point latch circuit 13. Data stored in the representative point memory 14 is read one frame later and applied to a horizontal vector detector 18 and a vertical vector detector 19 through a output side representative point latch circuit 15. On the other hand, data of an output signal $Y_L$ from the two-dimensional low-pass filter 2 is applied to the horizontal vector detector 18 through the horizontal pixel latch circuit 16 which latches at a timing corresponding to the pixel $P_{ij}(x,0)$ in the horizontal direction of the representative point. The horizontal vector detector 18 selects a block in which a vertical correlation in a frame detected by the vertical correlation detector 21 is larger than a prescribed value, and a movement $v_x$ of the image in the horizontal direction is detected from an inter-frame correlation between the representative point and the pixel $P_{ij}(x,0)$ in the horizontal direction thereof. Similarly, a vertical pixel latch circuit 17 latches a video signal output from the two-dimensional low-pass filter at a timing of the pixel corresponding to the vertical direction of the representative point and then the video signal is applied to the vertical vector detector 19. The vertical vector detector 19 selects a block in which a horizontal correlation value in a frame detected by the horizontal correlation detector 20 is larger than a prescribed value, and a movement $v_y$ of the image in the vertical direction is detected from an inter-frame correlation between the representative point and the pixel $P_{ij}(0,y)$ in the vertical direction thereof. The output $v_x$ from the horizontal vector detector 18 and the output $v_y$ from the vertical vector detector 19 are applied to the two-dimensional vector detector 22. In the two-dimensional vector detector 22, a two-dimensional moving vector V is calculated by one-dimensional moving vectors in the horizontal and vertical directions.

Figure 9:
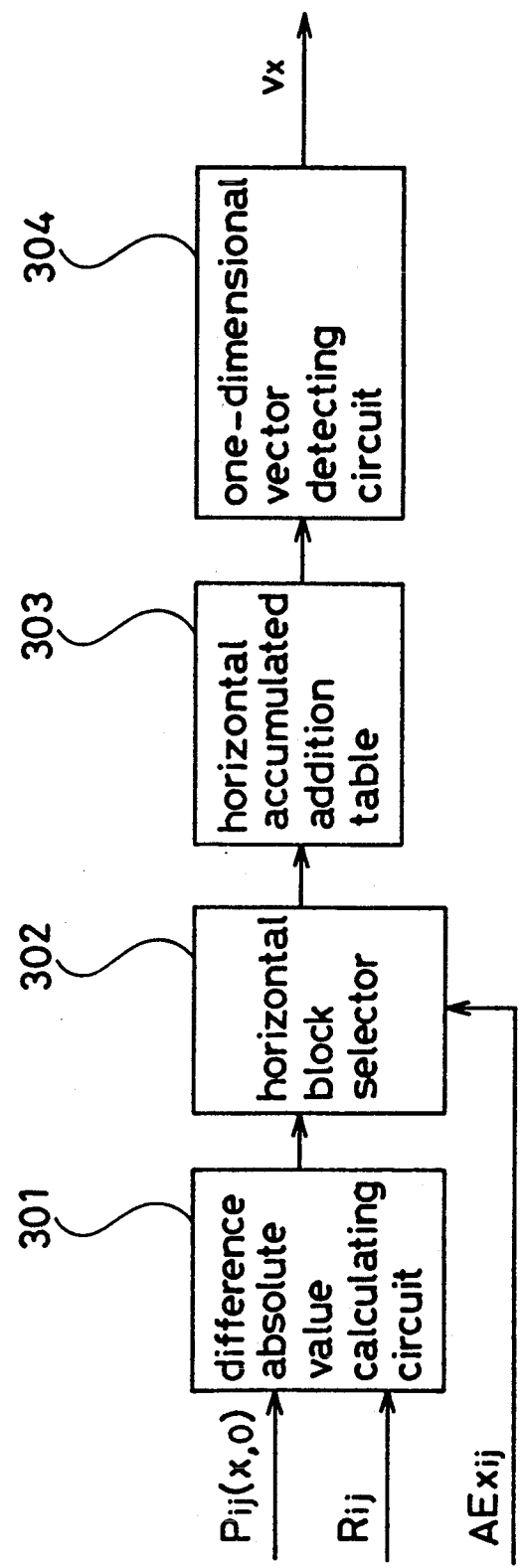
FIG. 9 is a block diagram showing a horizontal moving vector detecting circuit shown in FIG. 8.

FIG. 9 is a block diagram showing a structure of the horizontal vector detector 18 of the second embodiment of the present invention. The representative point signal $R_{ij}$ of the previous frame output from the output side representative point latch circuit 15 and the pixel signal $P_{ij}(x,0)$ of the present frame output from the horizontal pixel latch circuit 16 are calculated by the horizontal difference absolute value calculating circuit 301 to obtain an absolute value $d_{ij}(x,0) = |R_{ij} - P_{ij}(x,0)|$ of the difference between them. This calculation is performed in each block and an output signal $d_{ij}(x,0)$ from the difference absolute value calculating circuit 301 is input to a horizontal block selector 302. The block selector 302 outputs the signal $d_{ij}(x,0)$ from the difference absolute value calculating circuit 301 as it is when the output signal $AEx_{ij}$ from the vertical correlation detector 11 is "H" and outputs O when the $AEx_{ij}$ is "L". The output signal $d_{ij}(x,0)$ from the block selector 302 or 0 is input to the horizontal addition table 303 and added one after another to tables corresponding to the same address x of the pixel in each block ij of the horizontal accumulated addition table 303.

At this time, a value $D_x$ of the horizontal accumulated addition table is represented by the following equation, that is;

$$D_x = \Sigma |R_{ij} - P_{ij}(x,0)|$$

wherein ij in case where $AEx_{ij} = $"L" is excluded.

The result of the horizontal accumulated addition table 303 is input to the one-dimensional vector detecting means 304 and the address x when the table value $D_x$ of the accumulated addition table 303 is the minimum, i.e., the address x when the inter-frame correlation is the maximum, is detected as a horizontal component $v_x$ of the moving vector. Since the block in which the horizontal block selector 302 outputs 0 does not affect on the content of the horizontal accumulated addition table, the horizontal component $v_x$ of the moving vector is detected only from the block in which the vertical correlation value in the frame is larger than a prescribed value.

Figure 10:
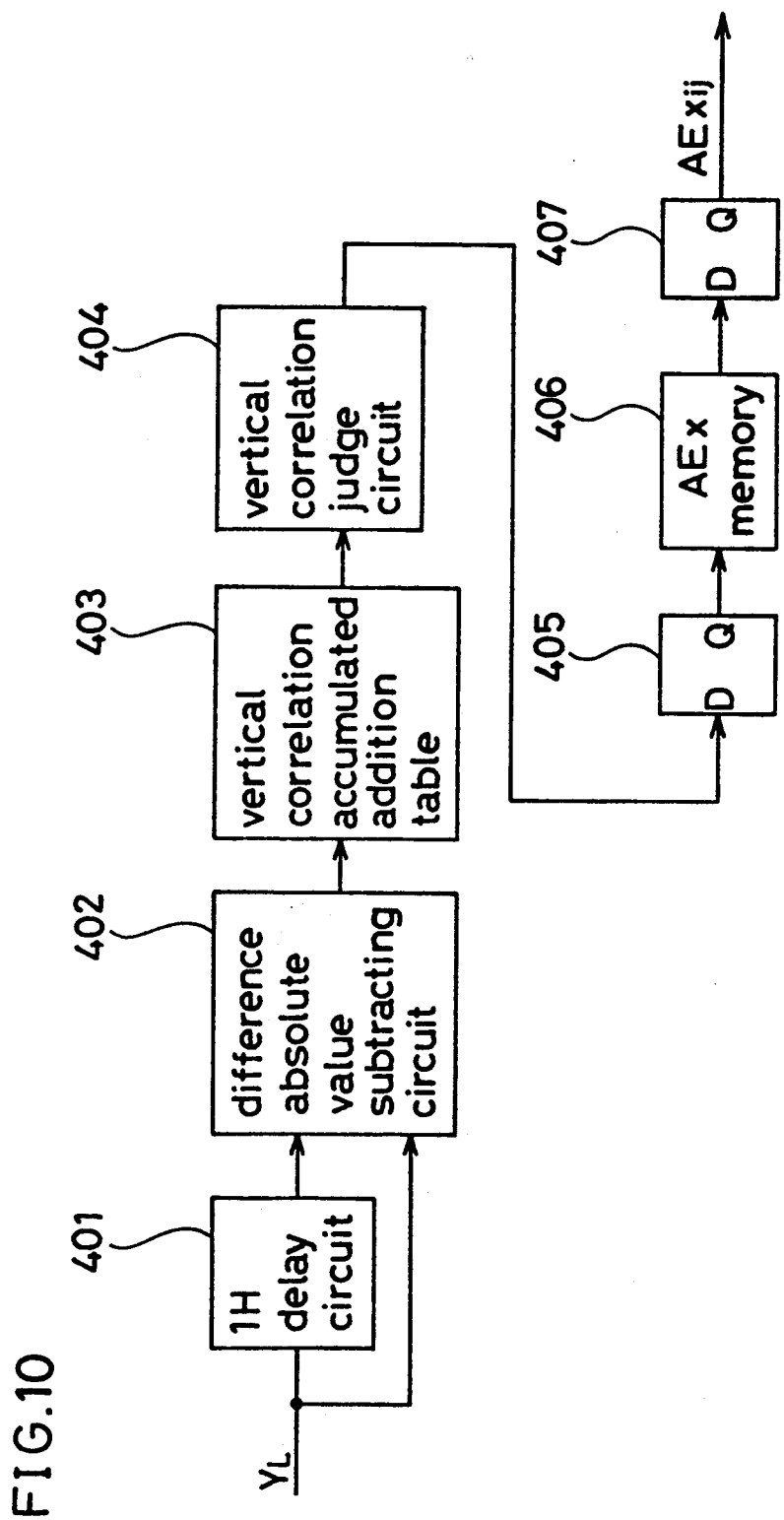
FIG. 10 is a block diagram showing a vertical correlation detector shown in FIG. 8.

A description is given of the vertical correlation detector 21. FIG. 10 is a block diagram showing a structure of the vertical correlation detector 21 of FIG. 8. The data $Y_L$ of the video signal output from the two-dimensional low-pass filter circuit 2 are transferred to a 1H delay circuit 401 and a difference absolute value calculating circuit 402. The 1H delay circuit 401 delays the data $Y_L$ by 1H period and the output is transferred to the difference absolute value calculating circuit 402. The data of the present pixel $P_{ij}(x,y)$ and the data of the 1H previous pixel $P_{ij}(x,y-1)$, which is delayed by the 1H delay circuit 401, are calculated by the difference absolute value calculating circuit 402 to obtain an absolute value $Sy_{ij} = |P_{ij}(x,y) - P_{ij}(x,y-1)|$ of the difference between them. This calculation is performed in each block and the output from the difference absolute value calculating circuit 402 is added on after another to the tables corresponding to each block of the vertical correlation accumulated addition table 403. At this time, the value $\Delta y_{ij}$ of the vertical correlation accumulated addition table is represented by the following equation, that is;

$$Dy_{ij} = \Sigma |P_{ij}(x,y) - P_{ij}(x,y-1)|.$$

This calculation is performed by accumulating the absolute value in the difference between pixels adjacent to each other in the vertical direction in the block and, when $\Delta y_{ij}$ is small, the correlation of the pixel in the vertical direction in the block is large. The result of the vertical correlation accumulated addition table 403 is input to a vertical correlation judging circuit 404, and "H" is output as an ADD enable signal $\Delta Ex_{ij}$ according to the block in which $\Delta y_{ij}$ is lower than a prescribed value $\epsilon_y$ while "L" is output according to the other blocks. The output from the vertical correlation judging circuit 404 is written in the AEx memory 406 through the latch circuit 405 in every block. When a moving vector is detected in the next frame, $\Delta Ex_{ij}$ corresponding to the block in which the difference absolute value calculating circuit 301 in the horizontal vector detector 8 performs the calculation is output to the horizontal block selector 302 through the latch circuit 407.

Generally, video signal has a correlation with respect to the time axis, so that the block having a high vertical correlation in the previous frame also has a high vertical correlation in the present frame. Accordingly, $d_{ij}(x,0)$ of the block having the high vertical correlation is selectively added to the horizontal accumulated addition table 303 and then the one-dimensional vector detecting means 304 detects the horizontal component of the moving vector from the block having the high vertical correlation.

Figure 11:
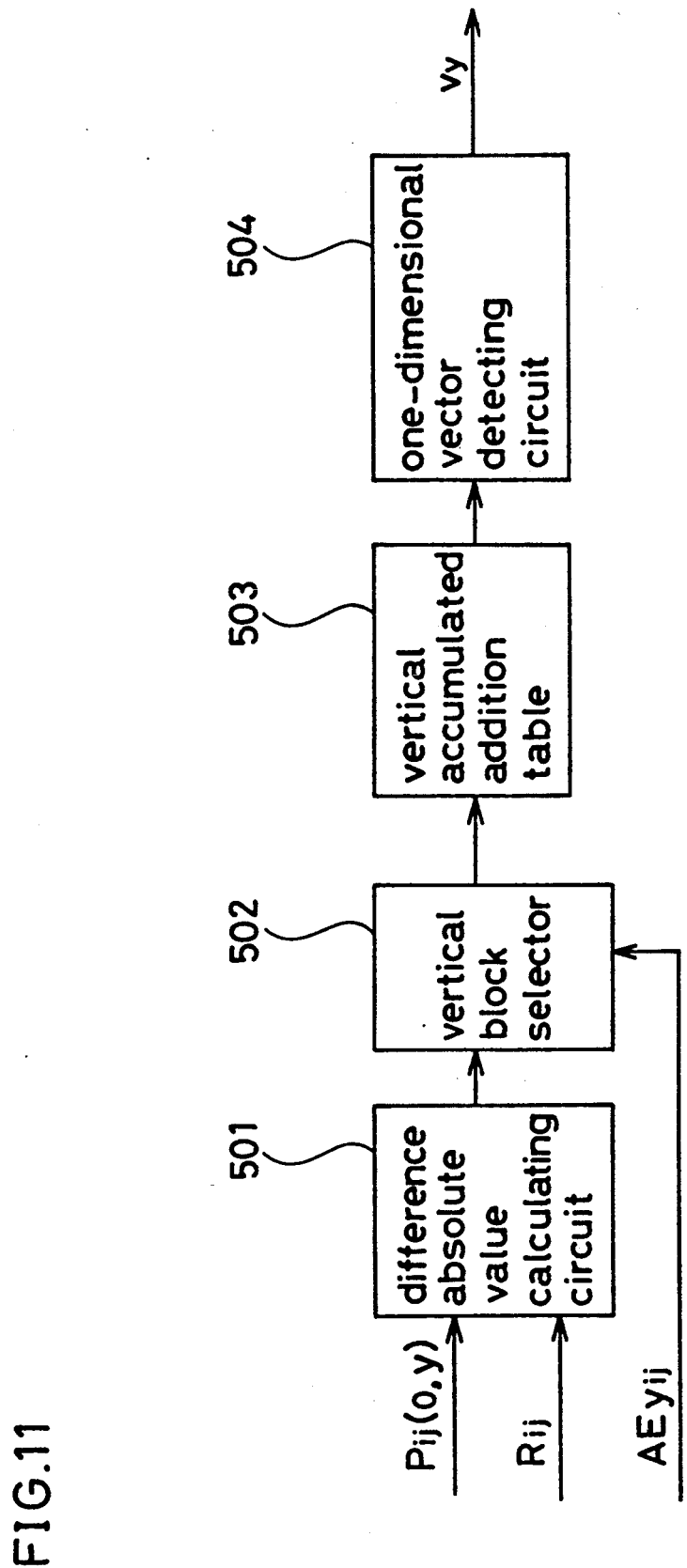
FIG. 11 is a block diagram showing a vertical vector detecting circuit shown in FIG. 8.

In addition, the vertical component of the moving vector can be obtained in the same way as described above. FIG. 11 is a block diagram showing a structure of the vertical vector detector 19 in accordance with the present invention.

The representative point signal $R_{ij}$ of the previous frame output from the output side representative point latch circuit 15 and the pixel signal $P_{ij}(0,y)$ of the present frame output from the vertical pixel latch circuit 17 are calculated by the difference absolute value calculating circuit 501 to obtain an absolute value $d_{ij}(0,y) = |R_{ij} - P_{ij}(0,y)|$ of the difference between them. This calculation is performed in each block and an output signal $d_{ij}(0,y)$ from the difference absolute value calculating circuit 501 is input to a vertical block selector 502. The block selector 502 outputs $d_{ij}(0,y)$ from the difference absolute value calculating circuit 501 as it is when the output signal $AEy_{ij}$ from the horizontal correlation detector 10 is "H38 and outputs 0 when $AEy_{ij}$ is "L". The output signal $d_{ij}(0,y)$ from the block selector 502 or 0 is input to the vertical accumulated addition table 503 and added one after another to tables corresponding to the same address y of the pixel in each block ij of the $d_{ij}(0,y)$ vertical accumulated addition table 503. At this time, a value $D_y$ of the vertical accumulated addition table is represented by the following equation, that is;

$$D_y = \Sigma |R_{ij} - P_{ij}(0,y)|$$

wherein ij in case where $AEy_{ij} = $"L" is excluded.

The result of the vertical accumulated addition table 503 is input to the one-dimensional vector detecting means 504 and the address y when the table value $D_y$ of the accumulated addition table 503 is the minimum, i.e., the address y when the inter-frame correlation is the maximum, is detected as a vertical component $v_y$ of the moving vector. Since the block in which the vertical block selector 502 outputs O does not affect on the content of the vertical accumulated addition table, the vertical component $v_y$ of the moving vector is detected only from the block in which the horizontal correlation value in the frame is larger than a prescribed value.

Figure 12:
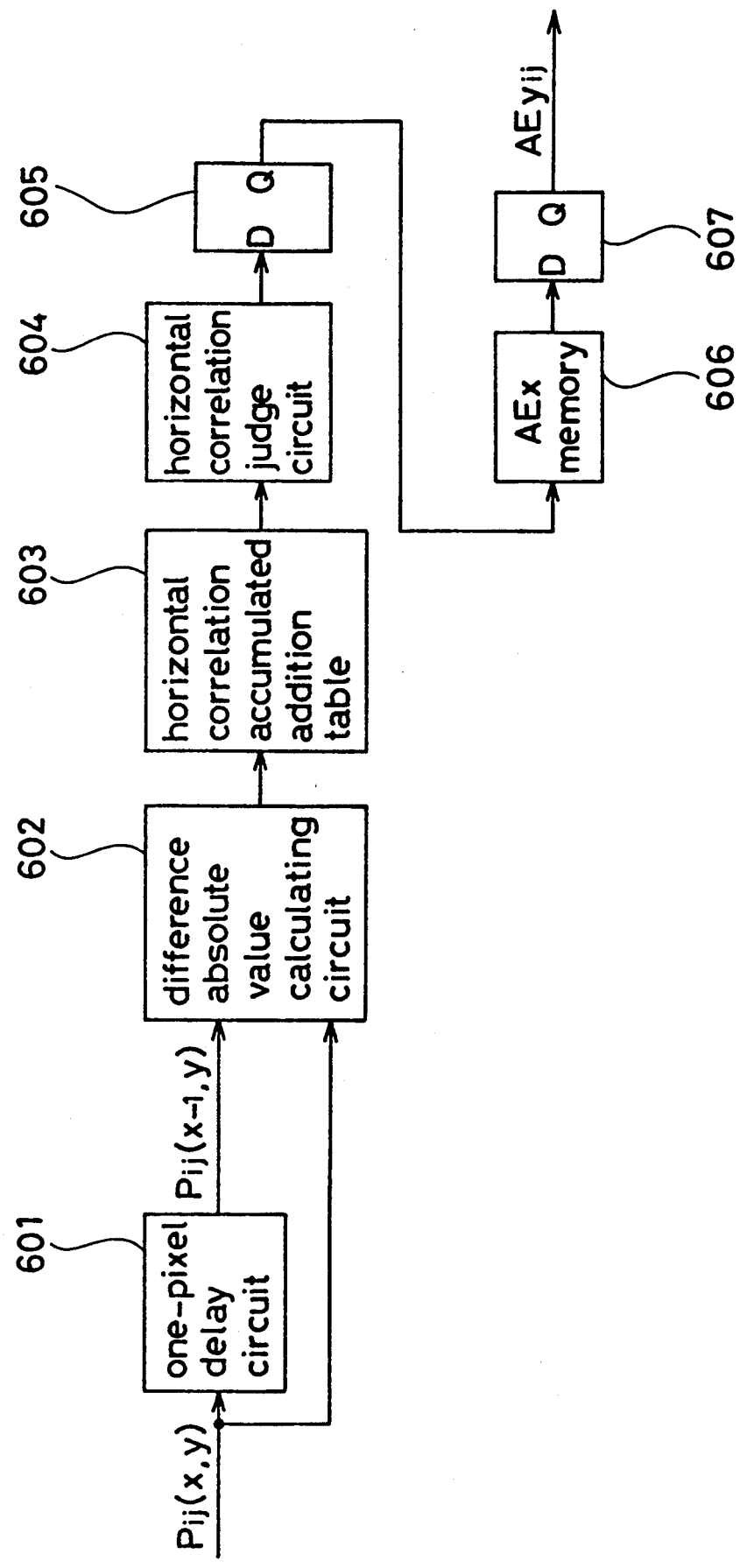
FIG. 12 is a block diagram showing a horizontal correlation detector shown in FIG. 8.

A description is given of the horizontal correlation detector 20. FIG. 12 is a block diagram showing a structure of the horizontal correlation detector 20 in accordance with the present invention. The output signal $Y_L$ from the two-dimensional low-pass filter circuit is transferred to a one pixel delay circuit 601 and a difference absolute value calculating circuit 602. The one pixel delay circuit 601 delays the data $Y_L$ of the input video signal for one pixel period and then the output is transferred to the difference absolute value calculating circuit 602. The present pixel $P_{ij}(x,y)$ and the data of the one pixel previous pixel $P_{ij}(x-1,y)$ which is delayed by the one pixel delay circuit 601 are calculated by the difference absolute value calculating circuit 602 to obtain an absolute value $Sx_{ij}(x) = |P_{ij}(x,y) - P_{ij}(x-1,y)|$ of the difference between them. This calculation is performed in each block and the output from the difference absolute value calculating circuit 602 is added one after another to the tables corresponding to each block of the horizontal correlation accumulated addition table 603. At this time, a value $\Delta x_{ij}$ of the horizontal correlation accumulated addition table is represented by the following equation, that is;

$$\Delta x_{ij} = \Sigma |P_{ij}(x,y) - P_{ij}(x-1,y)|$$

This calculation is performed by accumulating the absolute value in the difference between pixels adjacent to each other in the horizontal direction in the block and, when $\Delta x_{ij}$ is small, the correlation of the pixel in the horizontal direction of the representative point in the block is large. The result of the horizontal correlation accumulated addition table 603 is input to a horizontal correlation judging circuit 604, and "H" is output as an ADD enable signal $AEy_{ij}$ according to the block in which $\Delta x_{ij}$ is lower than a prescribed value $\epsilon_x$ while "L" is output according to the other blocks. The output from the horizontal correlation judging circuit 604 is written in the AEx memory 606 through the latch circuit 605 in every block. When a moving vector is detected in the next frame, $AEy_{ij}$ corresponding to the block in which the difference absolute value calculating circuit 501 in the vertical vector detector 19 performs the calculation is output to the vertical block selector 502 through the latch circuit 607.

Accordingly, $d_{ij}(0,y)$ of the block having a high horizontal correlation is selectively added to the vertical accumulated addition table 503 and the one-dimensional vector detecting means 504 detects the horizontal component of the moving vector from the block having the high horizontal correlation.

A description is given of the detecting precision in detecting a two-dimensional moving vector from two one-dimensional moving vectors in the horizontal and vertical directions, with reference to FIGS. 4(a)-4(c), 5(a)-5(c), 13(a)-13(b), and 14(a)-14(b). As described in the first embodiment, when the image is at a standstill, the vertical moving vector and the horizontal moving vector are both 0 vector as shown in FIGS. 4(a)-4(c).

In addition, as shown in FIGS. 5(a)-5(c), if the video signal moves by $x_1$ in the horizontal direction and by $y_1$ in the vertical direction for one frame, the vertical moving vector $v_y$ is $(0,y_1)$ and the horizontal moving vector $v_x$ is $(x_1,0)$.

Figure 13:
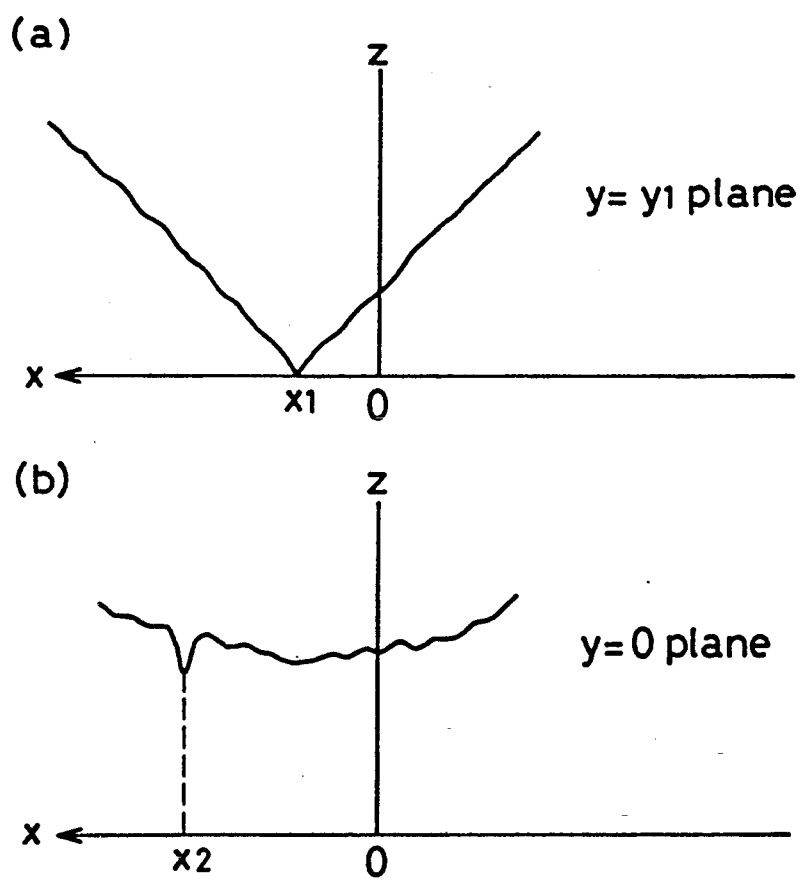
FIGS. 13(a)-13(b) are diagrams showing an example of an accumulated addition table $D_x$ which causes an error detection of a moving vector in the horizontal direction.

However, when the input video signal has a steep change in level, the accumulated addition table value $D_{xy}$ of the image is not in the form of the perfect cone but has a lot of irregularities in some cases. Such irregularities are apt to arise as the number of the blocks in the whole screen, i.e., the total number of the representative points, decrease. Therefore, even when the accumulated addition table $D_{xy}$ on a plane of $y=y_1$ parallel to the accumulated addition table $D_x$ and passing through the apex $(x_1,y_1,0)$ of the cone is like as shown in FIG. 13(a), if the image has a steep change in the vertical direction, the horizontal accumulated addition table $D_x$ apart from that point by $y_1$ in the vertical direction becomes as shown in FIG. 13(b), resulting in an error detection of the horizontal vector. Accordingly, in order to make the x coordinate of the minimum value of the horizontal accumulated addition table $D_x$ approximately equal to $x_1$, it is necessary to suppress the steep change in the dispersion of the value of the accumulated addition table $D_{xy}$ on the plane of $y=y_1$ and the dispersion of the value of the horizontal accumulated addition table $D_x$ on the plane of $y=0$. When the correlation of the image in the vertical direction is high, the variation in the accumulated addition table value in the vertical direction is reduced, so that the dispersion of the value of the accumulated addition table $D_{xy}$ on the plane of $y=y_1$ and the dispersion of the value of the horizontal accumulated addition table $D_x$ on the plane of $y=0$ do not suddenly change. In the present invention, the block having a high correlation in frame in the vertical direction is selected by the vertical correlation detector 21 and the horizontal block selector 302 to obtain the accumulated addition table. Therefore, the change of the correlation value in the vertical direction of the selected block is small and then the x coordinate of the minimum value of the accumulated addition table $D_x$ on the plane of $y=0$ is approximately equal to $x_1$, with the result that the error detection is significantly reduced.

Figure 14:
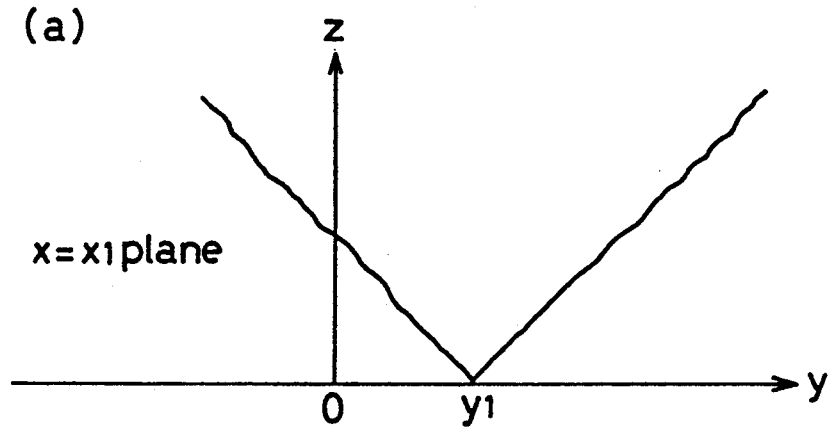
FIGS. 14(a)-14(b) are diagrams showing an example of an accumulated addition table $D_y$ which causes an error detection of a moving vector in the vertical direction.
Figure 14:
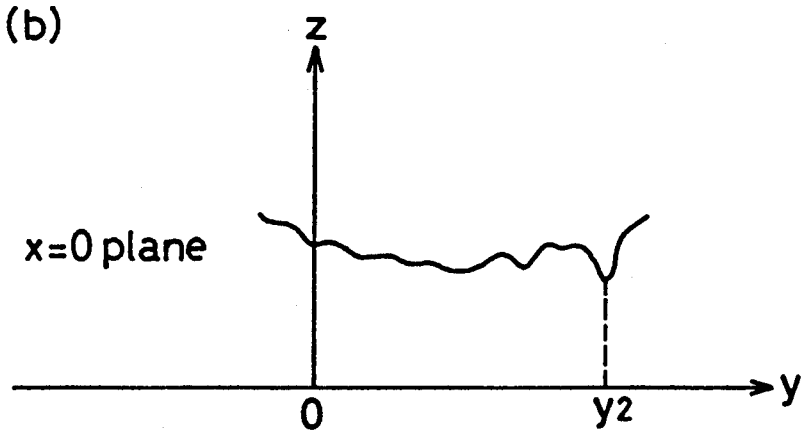

Also in a case of detecting the moving vector in the vertical direction, even when the accumulated addition table $D_{xy}$ on a plane of $x=x_1$ parallel to the vertical accumulated addition table $D_y$ and passing through the apex $(x_1,y_1,0)$ of the cone is like as shown in FIG. 14(a), if the image has a steep change in the horizontal direction, the vertical accumulated addition table $D_y$ apart from that point by $x_1$ in the horizontal direction becomes as shown in FIG. 14(b), resulting in an error detection of the vertical vector. Accordingly, in order to make the y coordinate of the minimum value of the vertical accumulated addition table $D_y$ approximately equal to the y coordinate $y_1$ of the minimum value of the accumulated addition table $D_{xy}$ on the plane of $x=x_1$, it is necessary to suppress the steep change in the dispersion of the value of the accumulated addition table $D_{xy}$ on the plane of $x=x_1$ and the dispersion of the value of the vertical accumulated addition table $D_y$ on the plane of $x=0$. When the correlation of the image in the horizontal direction is high, the change of the dispersion of the accumulated addition table value in the horizontal direction is reduced, so that the dispersion of the value of the accumulated addition table $D_{xy}$ on the plane of $x=x_1$ and the dispersion of the value of the vertical accumulated addition table $D_y$ on the plane of $x=0$ do not suddenly change. In the present invention, the block having a high correlation in frame in the horizontal direction is selected by the horizontal correlation detector 20 and the vertical block selector 502 to obtain the accumulated addition table. Therefore, the change of the correlation value in the horizontal direction of the selected block is small and then the y coordinate of the minimum value of the vertical accumulated addition table $D_y$ on the plane of $x=0$ is approximately equal to $y_1$, with the result that the error detection is significantly reduced.

The moving vector horizontal component $v_x$ and the moving vector vertical component $v_y$, i.e., two intersecting one-dimensional vectors, are input to the two-dimensional vector calculating means 22 and then it is found how far and in which direction the image position moved for one frame at a final state, i.e., a two-dimensional vector value V is found.

While in the above-described embodiment moving vectors between the frames of the image are detected, the present invention may be used for-detecting moving vectors between fields or the other time intervals.

While in the above-described embodiment the two-dimensional low-pass filter is provided, this may be dispensed with. However, the two-dimensional low-pass filter eliminates high-pass component including a lot of noise component from the video signal which is digitally converted, thereby further enhancing the detecting precision.

While in the above-described embodiment the horizontal correlation and the vertical correlation in each block are detected from the pixels in the whole blocks, they may be detected from a part of the blocks, for example, from a pixel in the horizontal direction and the vertical direction of the representative point.

In addition, constructions of the horizontal correlation detector and the vertical correlation detector are not restricted to those shown in the above embodiment.

Furthermore, in the above-described embodiment, in order to-detect the moving vector in the horizontal direction (or vertical direction) by selecting the block having a high vertical correlation (or horizontal correlation), "0" is added to the horizontal accumulated addition table (or vertical accumulated addition table) with respect to the block which is judged to have a low vertical correlation (or horizontal correlation) by the vertical correlation detector (or horizontal correlation detector). Instead of adding "0" with respect to the block having the low vertical correlation (or horizontal correlation), the adding operation itself of the horizontal accumulated addition table (or vertical accumulated addition table) may be halted.

Figure 15:
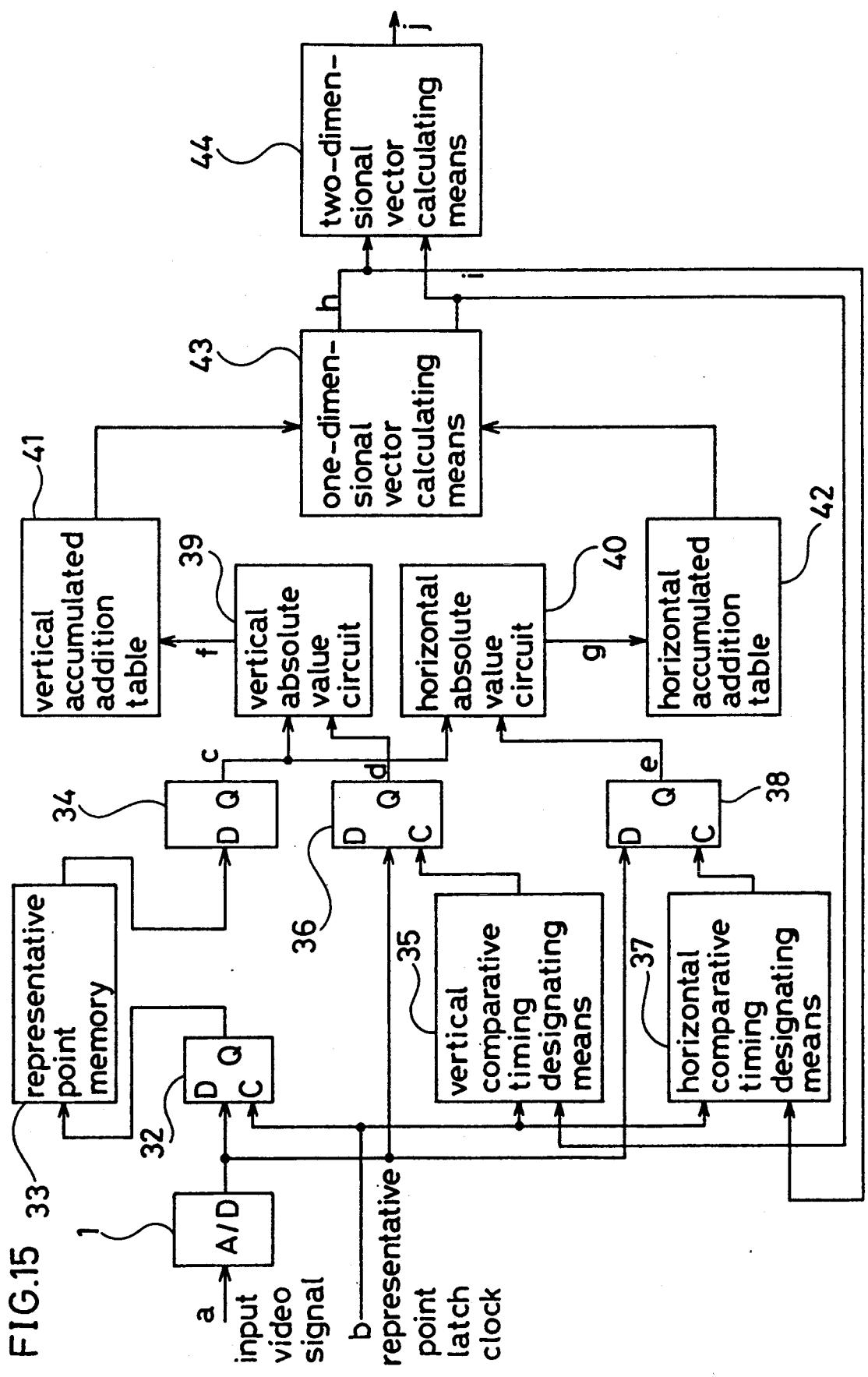
FIG. 15 is a block diagram showing a moving vector detecting apparatus in accordance with a third embodiment of the present invention.

FIG. 15 is a block diagram showing a moving vector detecting apparatus in accordance with a third embodiment of the present invention. In FIG. 15, an input video signal (a) is A/D converted by the A/D converter 1 and then a prescribed pixel to become the representative point 1021 in the block 1020 is written in the representative point memory through a latch circuit 32. Data stored in the representative point memory 33 is read one frame later and applied to a vertical absolute value circuit 39 and a horizontal absolute value circuit 40 through a latch circuit 34. On the other hand, the other A/D converted data of the video signal is applied to the vertical absolute value circuit 39 through a vertical pixel latch circuit 36 which latches at a timing obtained by that an m offset is given in the horizontal direction to a timing corresponding to a pixel in the vertical direction of the representative point by an A/D vertical comparative timing designating means 35 and also applied to the horizontal absolute value circuit 40 through a horizontal pixel latch circuit 38 which latches a representative point latch clock (b), which latches the representative point, at a timing obtained by that an n offset is given in the vertical direction to a timing corresponding to a pixel in the horizontal direction of the representative point by a horizontal comparative timing designating means 37. The absolute value of the difference between the representative point signal (c) of the previous frame output from the latch circuit 34 and the pixel signal (d) of the present frame output from the latch circuit 36 is calculated by the vertical absolute value circuit 39. The absolute value of the difference between the representative point signal (c) of the previous frame output from the latch circuit 34 and the pixel signal (e) of the present frame output from the latch circuit 38 is calculated by the horizontal absolute value circuit 40. These calculations are made in each block and an output signal (f) from the vertical absolute value circuit 39 is added one after another to tables corresponding to the same address of the pixel in-each block of the vertical accumulated addition table 41 while an output signal (g) from the horizontal absolute value circuit 40 is added one after another to tables corresponding to the same address of the pixel in each block of the horizontal accumulated addition table 42. Both of the result of the addition in the horizontal accumulated addition table 42 and the result of the addition in the vertical accumulated addition table 41 are input to a one-dimensional vector detecting means 43 and then the vertical moving vector (h) and the horizontal moving vector (i) are detected. The vertical moving vector (h) and the horizontal moving vector (i) thus obtained, which are two one-dimensional vectors, are input to a two-dimensional vector calculating means 44 and it is determined how far and which direction the image position moved for one frame in the final stage, that is, a two-dimensional moving vector value (j) is determined.

Figure 16:
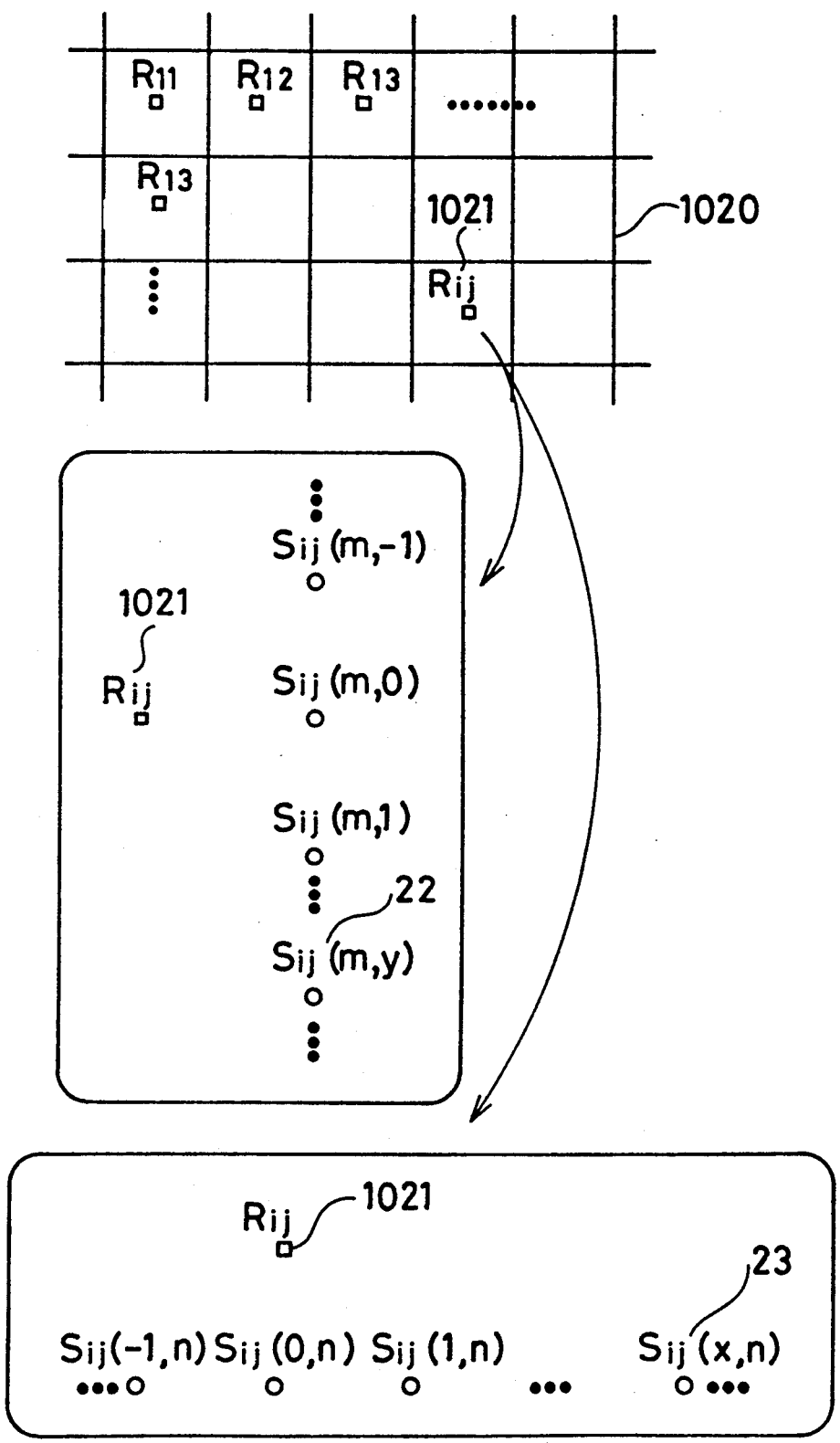
FIG. 16 is a schematic diagram showing a relation between a block and a representative point in an image in accordance with the third embodiment.

FIG. 16 shows the relation between the block and the representative point of the image shown in FIG. 15. The image of one field is divided into prescribed number of blocks 1020 and one representative point $R_{ij}$ 1021 is provided at the center of each block. The level difference between the representative point in the previous frame and a pixel $S_{ij}(m,y)$ 1022 obtained by that an m offset is given in the horizontal direction to the pixel in the vertical direction of the representative point in the block and a pixel $S_{ij}(x,n)$ 1023 obtained by that an n offset is given in the vertical direction to the pixel in the horizontal direction of the representative point in the block is calculated every block and then the level difference is added one after another to tables corresponding to the same address of the pixel in each block. It is found that how far and which direction the image position moved in the vertical and horizontal directions for one frame by a block address in which the addition result is the minimum in each area, i.e., the vertical moving vector value (h) and the horizontal moving vector value (i) are determined.

More specifically, a vertical accumulated addition table $D_y$ is obtained by finding the absolute value of the difference between the representative point $R_{ij}$ and a signal $S_{ij}(m,y)$ positioned apart from a point, which gives (m,0) offset to the representative point, in the vertical direction by y and adding the same over those at the same position y relation with respect to each representative point, and a horizontal accumulated addition table $D_x$ is obtained by finding the absolute value of the difference between the representative point $R_{ij}$ and a signal $S_{ij}(x,n)$ positioned apart from a point, which gives (0,n) offset to the representative point, in the horizontal direction by x and adding the same over those at the same position x relation-with respect to each representative point. At this time, they are represented by the following equations, that is;

$$D_X = \Sigma |R_{ij} - S_{ij}(x,n)|$$

$$D_y = \Sigma |R_{ij} - S_{ij}(m,y)|$$

Then, the minimum x and y in the $D_x$ and $D_y$ are set as the horizontal moving vector (i) and the vertical moving vector (h), respectively.

A description is given of the detecting precision in detecting two intersecting one-dimensional moving vectors from the vertical accumulated addition table and the horizontal accumulated addition table, in which the correlation of the image decreases in proportion to the distance both in the horizontal direction and the vertical direction.

Figure 17:
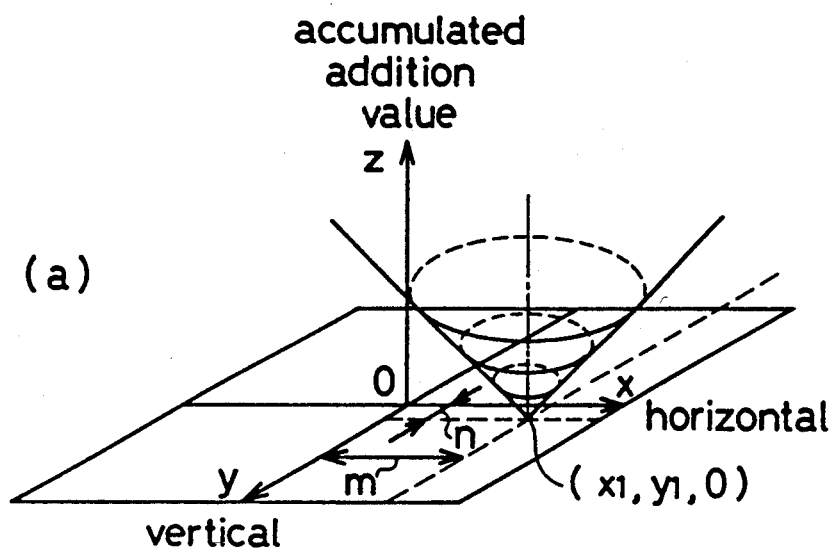
FIGS. 17(a)-17(c) are diagrams showing accumulated addition tables in three-dimension and in two-dimension in accordance with the third embodiment.
Figure 17:
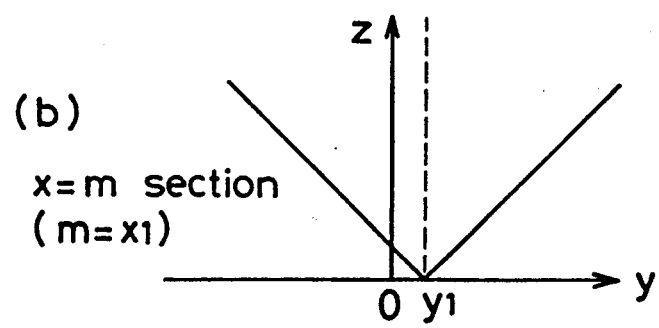
Figure 17:
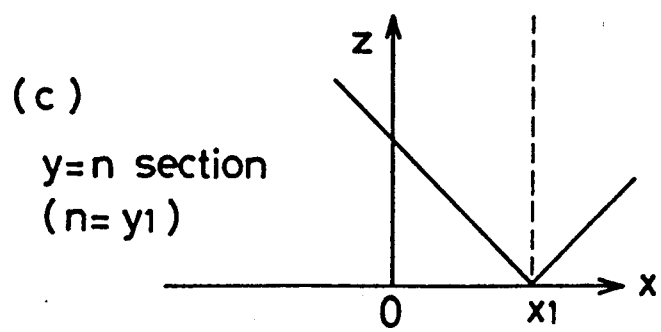
Figure 24A:
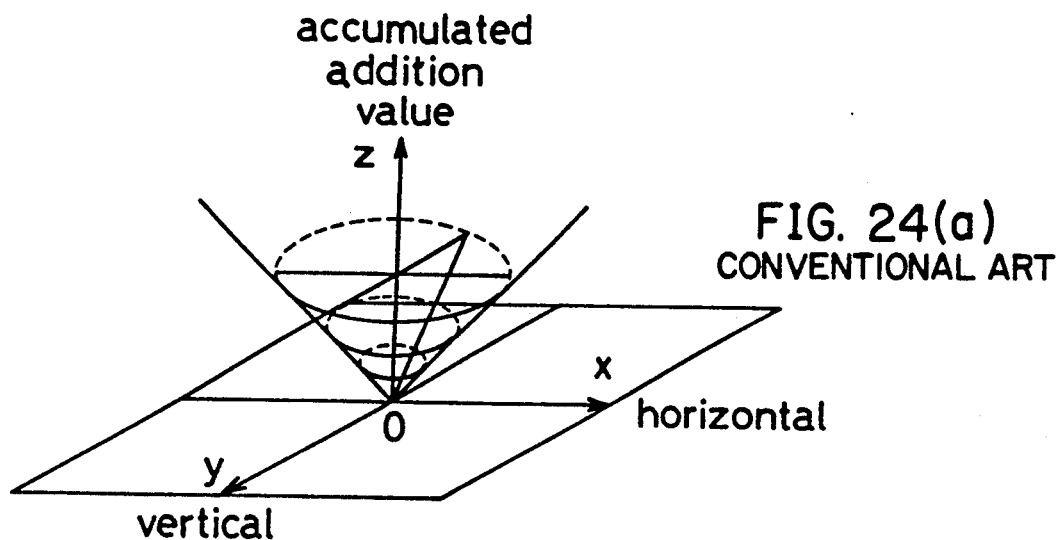
Figure 24B:
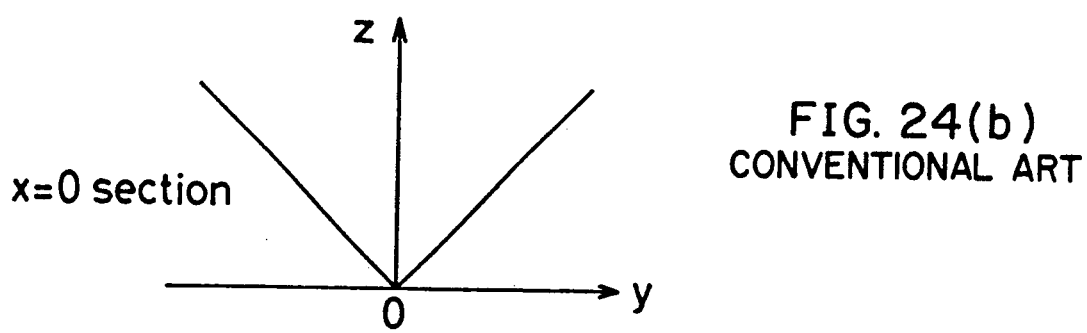
Figure 24C:
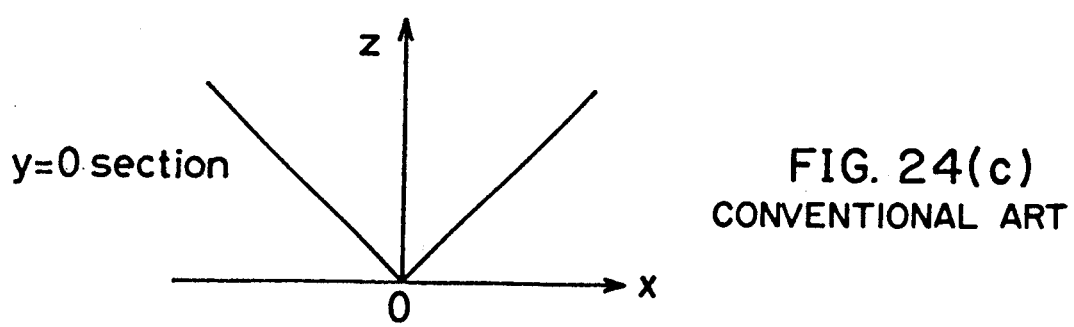
Figure 25A:
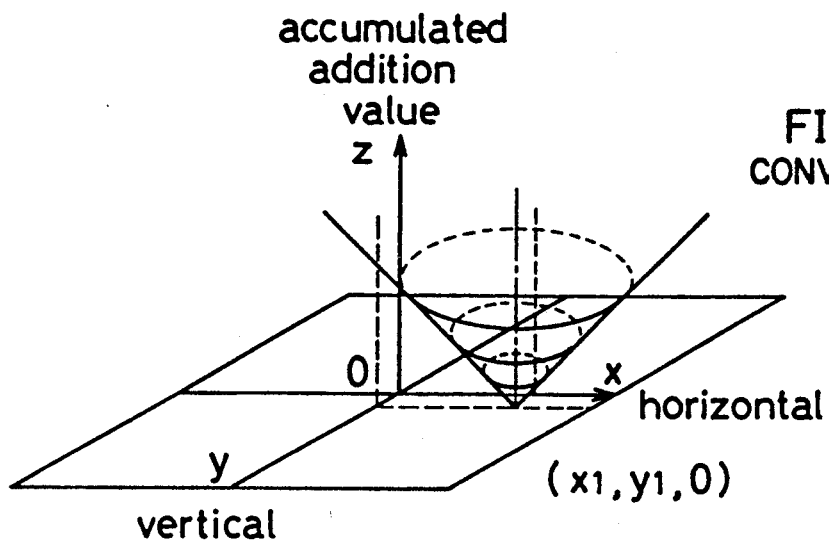
Figure 25B:
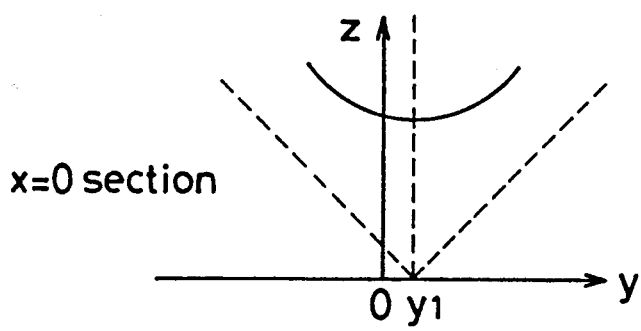
Figure 25C:
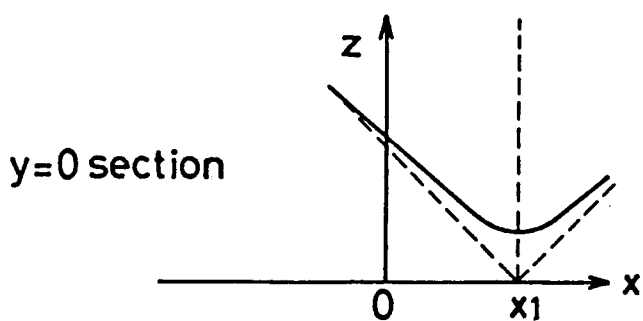

Like FIGS. 24(a) and 25(a), FIG. 17(a) shows the accumulated addition table corresponding to the whole number of pixels in the block in which a horizontal direction (x), a vertical direction (y) and a value of the accumulated addition table (z) are represented by three dimensions with the representative point as the origin. FIG. 17(b) shows the vertical accumulated addition table $D_Y$ obtained by finding the absolute value of the difference between the representative point $R_{ij}$ and a signal $S_{ij}(m,y)$ positioned apart from a point, which gives (m,0) offset to the representative point, in the vertical direction by y and adding the same over those at the same position y relation with respect to each representative point, in which the vertical direction (y) and the value of the accumulated addition table (z) are represented by two dimensions with the representative point as the origin. That is, FIG. 17(b) corresponds to a cross-section of a plane of x=m in FIG. 17(a). FIG. 17(c) shows the horizontal accumulated addition table $D_X$ obtained by finding the absolute value of the difference between the representative point $R_{ij}$ and a signal $S_{ij}(x,n)$ positioned apart from a point, which gives (0,n) offset to the representative point, in the horizontal direction by x and adding the same over those at the same position x relation with respect to each representative point, in which the horizontal direction (x) and the value of the accumulated addition table (z) are represented by two dimensions with the representative point as the origin. That is, FIG. 17(c) corresponds to a cross-section of a plane of y=n in FIG. 17(a).

in FIG. 17(a), if the picture moves largely by $x_1$ in the horizontal direction and slightly by $y_1$ in the vertical direction for one frame, the accumulated addition table is in the form of the inverted cone with $(x_1,y_1,0)$ as an apex shown in FIG. 17(a). At this time, if the offset value m is equal to $x_1$ in the vertical comparative timing designating means 35, the vertical accumulated addition table 41 is the value of a cross-section of the cone at the plane of $x=x_1$ as shown in FIG. 17(b). In addition, if the offset value n is equal to $y_1$ in the horizontal comparative timing designating means 37, the horizontal accumulated addition table 42 is the value of a cross-section of the cone at the plane of $y=y_1$ as shown in FIG. 17(c). Accordingly, the hyperbolic curve on the cross-section is steep both in FIGS. 17(b) and 17(c). Then, as can be seen from FIG. 17(b), the value of the vertical accumulated addition table 41 is the minimum when $y=y_1$.

Also, as can be seen from FIG. 17(c), the value of the horizontal accumulated addition table 42 is the minimum when $x=x_1$.

Actually, it is impossible to set the offset value m in the vertical comparative timing designating means 35 and the offset value n in the horizontal comparative timing designating means 37 to the moving vector detecting values $x_1$ and $y_1$ at the present point of time, respectively. However, when the movement is slow, the horizontal moving vector value $x_0 \approx x_1$ previously detected is made the offset value m in the vertical comparative timing designating means 35 and the vertical moving vector value $y_0 \approx y_1$ previously detected is made the offset value n in the horizontal comparative timing designating means 37, whereby the detecting precision is significantly improved.

In this embodiment, although the moving vector detecting precision is influenced by the offset value, the detected moving vector value is not influenced by the offset value because it is not necessary to add the offset value to the detected moving vector value, resulting in a simple construction of the moving vector detecting apparatus.

Figure 18:
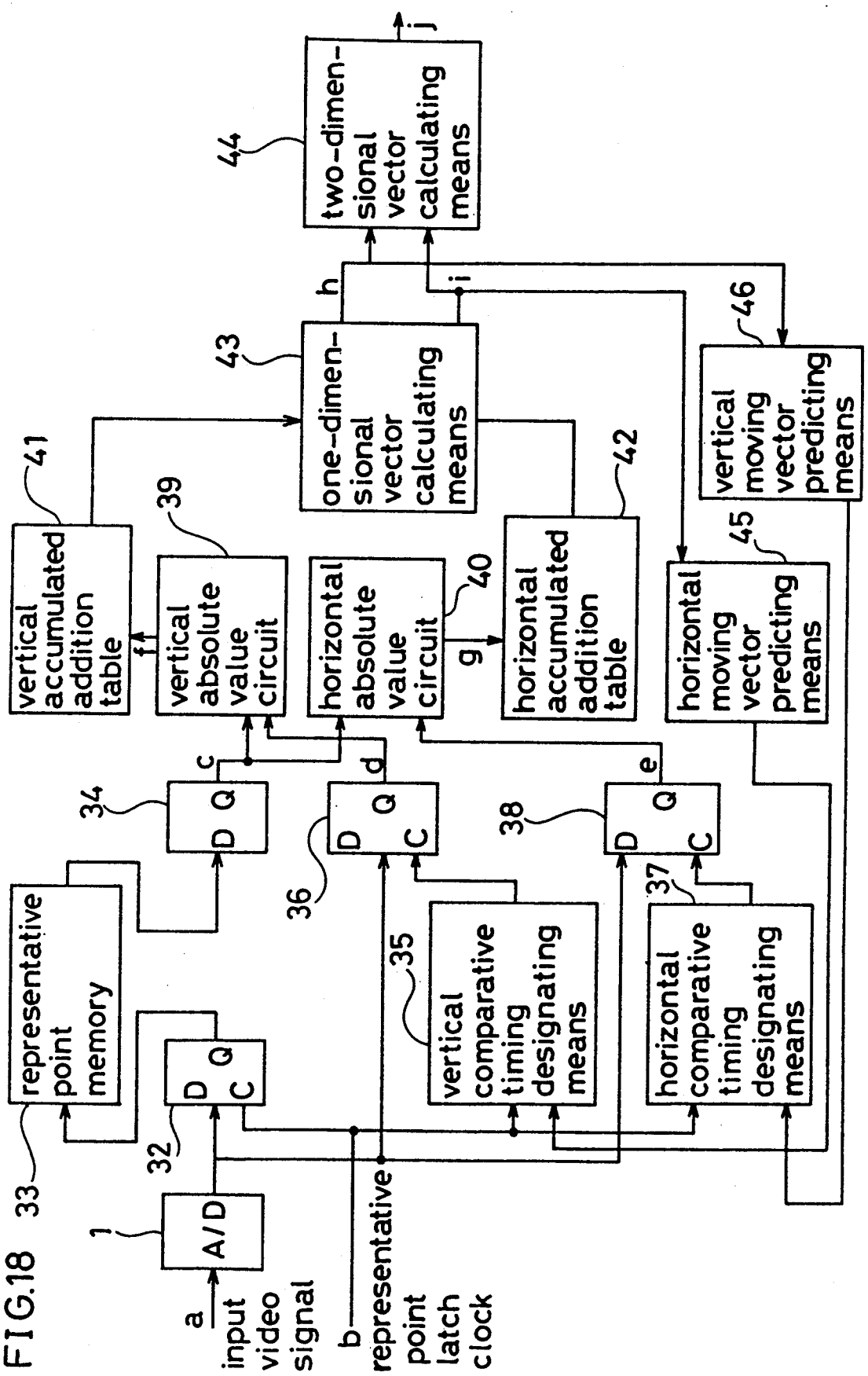
FIG. 18 is a block diagram showing a moving vector detecting apparatus in accordance with a fourth embodiment of the present invention.

FIG. 18 is a block diagram showing a moving vector detecting apparatus in accordance with a fourth embodiment of the present invention. In FIG. 18, an input video signal (a) is A/D converted by the A/D converter 1 and then a prescribed pixel to become the representative point 1021 in the block 1020 is written in the representative point memory 33 through a latch circuit 32. Data stored in the representative point memory 33 is read one frame later and applied to a vertical absolute value circuit 39 and a horizontal absolute value circuit 40 through a latch circuit 34. On the other hand, the A/D converted data of the video signal is applied to the vertical absolute value circuit 39 through a vertical pixel latch circuit 36 which latches at a timing obtained by that an offset by m in the horizontal direction is given to a timing corresponding to a pixel in the vertical direction of the representative point and also applied to the horizontal absolute value circuit 40 through a horizontal pixel latch circuit 38 which latches at a timing obtained by that an offset by n in the vertical direction is given to the timing corresponding to the pixel in the horizontal direction of the representative point. The offset value m in the horizontal direction is given by a vertical comparative timing designating means 35. That is, the offset value m is determined from the value of the horizontal moving vector predicted by the horizontal moving vector predicting means 45 with the representative point latch clock b, which latches the representative point, as a reference. Similarly, the offset value n in the vertical direction is given by the horizontal comparative timing designating means 37. That is, the offset value n is determined from the value of the vertical moving vector predicted by the vertical moving vector predicting means 46 with the representative point latch clock b, which latches the representative point, as a reference. The absolute value of the difference between the representative point signal (c) of the previous frame output from the latch circuit 34 and the pixel signal (d) of the present frame output from the latch circuit 36 is calculated by the vertical absolute value circuit 39. The absolute value of the difference between the representative point signal (c) of the previous frame output from the latch circuit 34 and the pixel signal (e) of the present frame output from the latch circuit 38 is calculated by the horizontal absolute value circuit 40. These calculations are made in each block and an output signal (f) from the vertical absolute value circuit 39 is added one after another to tables corresponding to the same address of the pixel in each block of the vertical accumulated addition table 41 while an output signal (g) from the horizontal absolute value circuit 40 is added one after another to tables corresponding to the same address of the pixel in each block of the horizontal accumulated addition table 42. Both of the result of the addition in the horizontal accumulated addition table 42 and the result of the addition in the vertical accumulated addition table 41 are input to a one-dimensional vector detecting means 43 and then the vertical moving vector (h) and the horizontal moving vector (i) are detected. The vertical moving vector (h) and the horizontal moving vector (i) thus obtained, i.e., two one-dimensional vectors, are input to a two-dimensional vector calculating means 44 and finally it is determined how far and which direction the image position moved for one frame, that is, a two-dimensional moving vector value (j) is determined. In addition, the vertical moving vector (h) and the horizontal moving vector (i) are input to the vertical moving vector predicting means 46 and the horizontal moving vector predicting means 45, respectively, and these vectors are used for the next prediction of moving vectors.

A description is given of the detecting precision when two intersecting one-dimensional moving vectors are obtained from the vertical accumulated addition table and the horizontal accumulated addition table in accordance with the fourth embodiment, in which the correlation of the image decreases in proportion to the distance both in the horizontal and vertical directions.

In FIG. 17(a), if the picture moves largely by $x_1$ in the horizontal direction and slightly by $y_1$ in the vertical direction for one frame, the accumulated addition table is in the form of the inverted cone with $(x_1,y_1,0)$ as an apex shown in FIG. 17(a). At this time, if the horizontal moving vector predicted by the horizontal moving vector predicting means 45, i.e., the offset value m of the vertical comparative timing designating means 35, can precisely be predicted as $x_1$, the vertical accumulated addition table 41 is the value of a section of the cone on the plane of $x=x_1$ as shown in FIG. 3(b). Since the hyperbolic curve of the cross-section is steep in FIG. 3(b), it is determined with high precision that the value of the vertical accumulated addition table 41 is the minimum when $y=y_1$. In addition, if the vertical moving vector predicted by the vertical moving vector predicting means 46, i.e., the offset value n of the horizontal comparative timing designating means 37, can precisely be predicted as $y_1$, the vertical accumulated addition table 42 is the value of a section of the cone on the plane of $y=y_1$ as shown in FIG. 3(c). Since the hyperbolic curve of the cross-section is steep in FIG. 3(c), it is determined with high precision that the value of the horizontal accumulated addition table 42 is the minimum when $x=x_1$.

That is, when two intersecting one-dimensional vectors are detected from the vertical accumulated addition table and the horizontal accumulated addition table, whether the predicted moving vector is near the actual moving vector or not has a great influence on the moving vector detecting precision.

A description is given of the moving vector predicting means. Since a moving vector is calculated at a discrete value, when a moving vector is predicted, an error largely depends on the relation between the field or frame, which is a calculation period of the moving vector, and a frequency of the actual moving vector. Therefore, in Japanese Patent Published Application No. 2-241187, the frequency components of the moving vector are detected and, when there are few high frequency components, difference prediction is used and, when there are a lot of high frequency components, low-pass filter is used. According to the difference prediction, when the moving vector obtained by the last detection is $V(t-1)$ and that obtained by the last detection but one is $V(t-2)$, the predicted moving vector $V(t)$ is represented by the following equation, that is;

$$V(t)=2a\cdot V(t-1)-b\cdot V(t-2)$$

wherein a and b are coefficients. This is most effective when the difference of the moving vector is constant.

However, since the low frequency component of the moving vector varies smoothly, the moving vector can be predicted with higher precision when difference of difference, i.e., secondary difference is constant than when the difference is constant. Accordingly, when the moving vector obtained by the last detection but two is $V(t-3)$, the predicted moving vector $V(t)$ is represented by the following equations, that is;

$$V(t) - V(t-1) - \{V(t-1) - V(t-2)\} = \\ V(t-1) - V(t-2) - \{V(t-2) - V(t-3)\},$$

therefore, $$V(t)=3\cdot V(t-1)-3\cdot V(t-2)+V(t-3).$$

Figure 19:
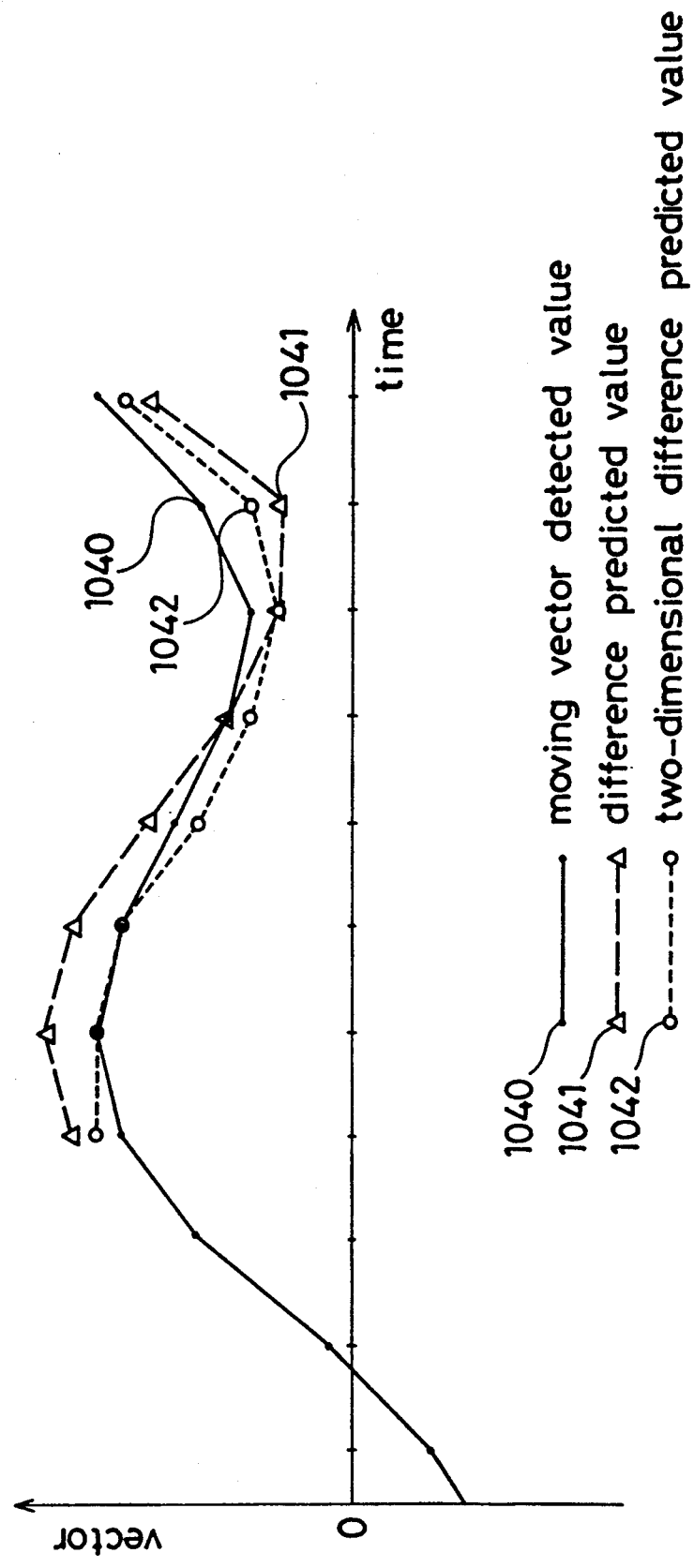
FIG. 19 is a graph showing a precision of secondary difference estimating means in accordance with the fourth embodiment.
Figure 20:
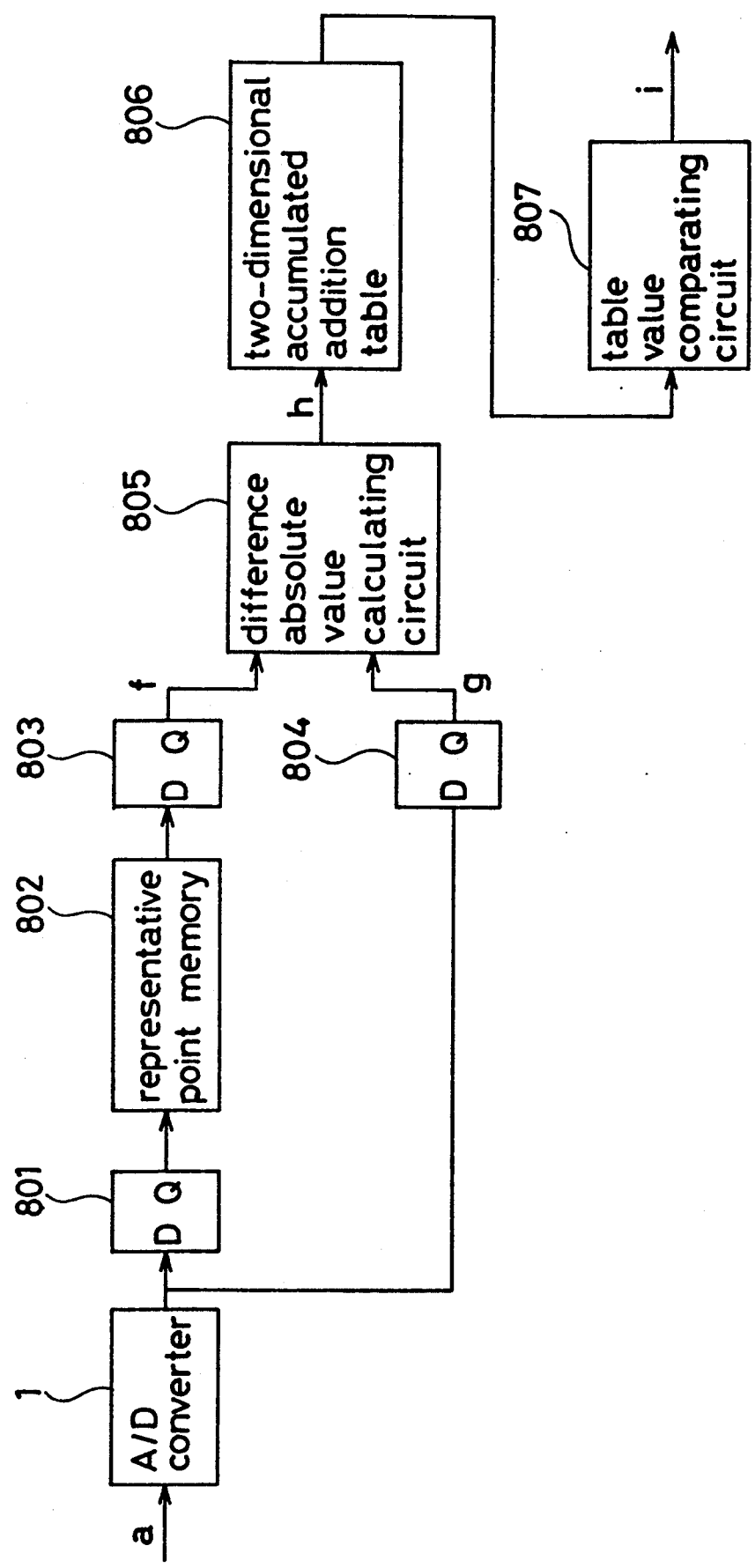
FIG. 20 is a block diagram showing a conventional moving vector detecting apparatus.
Figure 21:
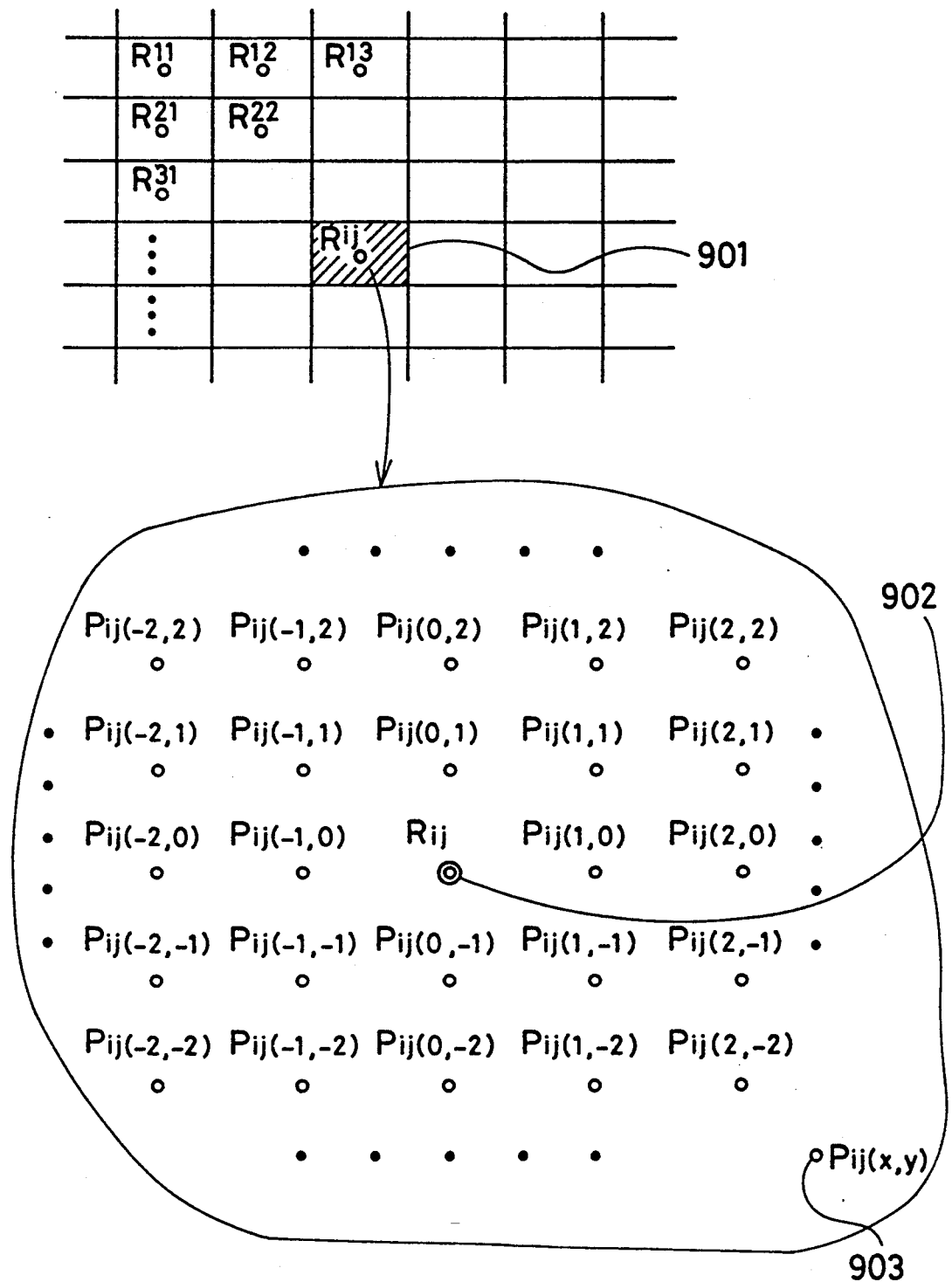
FIG. 21 is a schematic diagram showing a relation between a block and a representative point in an image in a representative point calculation according to the conventional art.
Figure 22:
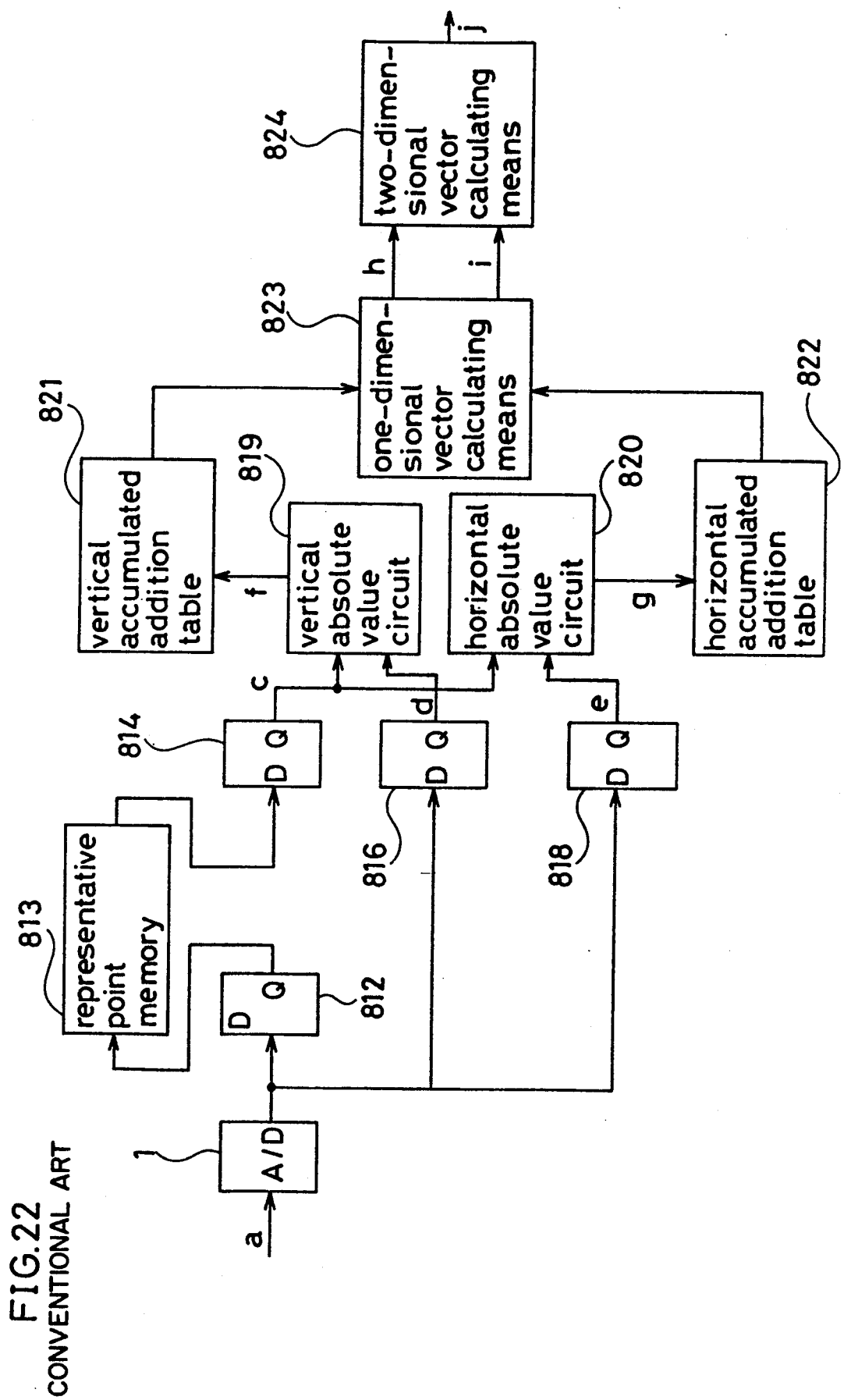
FIG. 22 is a block diagram showing the conventional moving vector detecting apparatus which detects a moving vector from two intersecting one-dimensional moving vectors.
Figure 23:
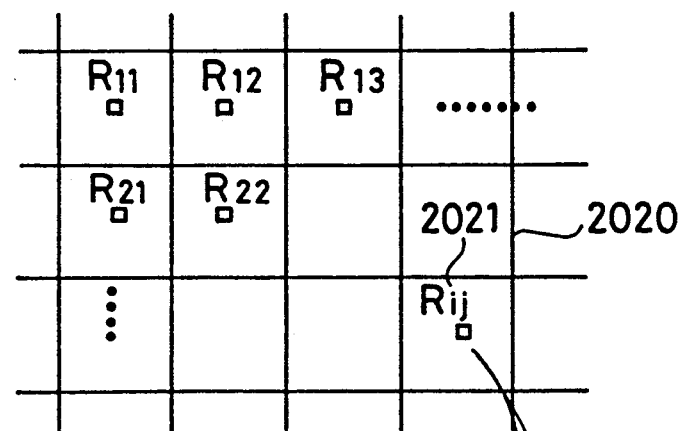
FIG. 23 is a schematic diagram showing a relation between a block and a representative point in an image in the conventional moving vector detecting apparatus which detects a moving vector from two intersecting one-dimensional moving vectors.
Figure 23:
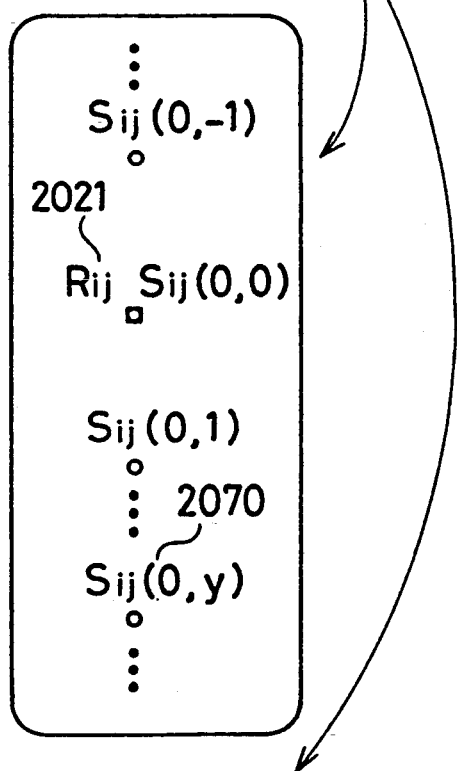
Figure 23:
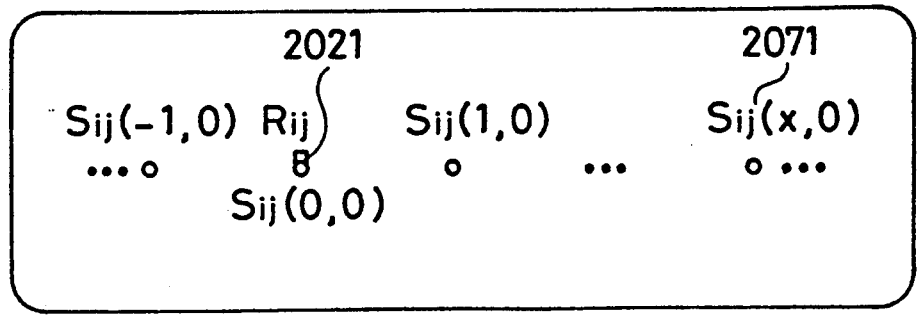

FIG. 19 is a graph showing a moving vector of the image in a case where a user shoots scenes with a video camera in his hand while trying not to move the camera. In FIG. 19, reference numeral 1040 designates a moving vector which changes with time. Reference numeral 1041 designates an predicted moving vector V(t) obtained by the above-described difference predicting means. Reference numeral 1042 designates an predicted moving vector V(t) obtained by the above-described secondary difference predicting means. As can be seen from FIG. 19, the secondary difference predicting means ensures a higher detecting precision than the difference predicting means.

As is evident from the foregoing description, according to the first embodiment of the present invention, a moving vector detecting apparatus includes a horizontal low-pass filter for extracting a low-pass component in a horizontal direction of an input image signal; first moving vector detecting means for detecting a moving vector in a vertical direction of an image, by an inter-frame correlation between a representative point and a pixel on a vertical straight line through the representative point, from the output signal of the horizontal low-pass filter; a vertical low-pass filter for extracting a low-pass component of an input image signal in a vertical direction; and second moving vector detecting means for detecting a moving vector in a horizontal direction of the image, by an inter-frame correlation between the representative point and a pixel on a horizontal straight line through the representative point, from the output signal of the vertical low-pass filter. Therefore, the horizontal component of the moving vector is detected from the signal component having a high vertical correlation and the vertical component of the moving vector is detected from the signal component having a high horizontal correlation both by the one-dimensional moving vector detecting means, with the result that the moving vector can be detected with a few accumulated addition tables in short calculating time.

In addition, according to the second embodiment of the present invention, a moving vector detecting apparatus includes a vertical correlation detecting means for detecting a correlation in a vertical direction in each block of a video signal, a first moving vector detecting means for detecting a moving vector in a horizontal direction of the video signal from a block which is judged to have a high vertical correlation by the vertical correlation detecting means, a horizontal correlation detecting means for detecting a correlation in a horizontal direction in each block of the video signal, and a second moving vector detecting means for detecting a moving vector in a vertical direction of the video signal from a block which is judged to have a high horizontal correlation by the horizontal correlation detecting means. The horizontal component of the moving vector is detected from the video signal of the block having a high vertical correlation and the vertical component of the moving vector is detected from the video signal of the block having a high horizontal correlation both by the one-dimensional moving vector detecting means. As the result, a precise detection can be performed with a small number of accumulated addition tables in a short calculating time.

In addition, according to the third embodiment of the present invention, the representative point in the block is compared with the pixel on a vertical straight line passing through a point which gives an offset of (m,0) to the representative point while the representative point is compared with the pixel on a horizontal straight line passing through a point which gives an offset of (0,n), and two one-dimensional vectors are calculated from the vertical accumulated addition table and the horizontal accumulated addition table thus obtained, and then a two-dimensional moving vector is calculated from the vertical direction moving vector and the horizontal direction moving vector thus obtained, which are the two intersecting one-dimensional vectors. Therefore, a precise detection can be achieved with a few accumulated addition tables in a short calculating time. In addition, a moving vector detecting apparatus, in which the detecting precision is not poor even when the image largely moves, is achieved.

In addition, according to the fourth embodiment of the present invention, the representative point is compared with a pixel in the vertical direction of a point which gives an offset of an predicted horizontal moving vector (m,0) to the representative point and a pixel in the horizontal direction of a point which gives an offset of an predicted vertical moving vector (0,n) to the representative point. Then two one-dimensional vectors are separately calculated from the vertical accumulated addition table and the horizontal accumulated addition table, and the two-dimensional moving vector is calculated from the vertical direction moving vector and the horizontal direction moving vector, which are two intersecting one-dimensional vectors. Thereby, the moving vector is detected with high precision, with a few accumulated addition tables in a short calculating time. In addition, it is possible to provide a moving vector detecting apparatus in which the detecting precision is not poor even when the image moves largely. In addition, by improving the precision in detecting an predicted moving vector, the precision in detecting the other moving vector is further improved. This is effective in practical use.

What is claimed is:

1. A moving vector detecting apparatus in which moving vectors of an entire screen are detected from an amount of movement of a representative pixel in each of a plurality of blocks which comprise the entire screen in order to detect an amount of movement in a predetermined period, said moving vector detecting apparatus comprising:

a horizontal low-pass filter for extracting a low-pass component of an image signal of the entire screen in a horizontal direction;

first moving vector detecting means for detecting a moving vector in a vertical direction of the image signal, by correlating each of the representative points with a pixel output from said horizontal low-pass filter having a vertical component equal to each respective representative point for the predetermined period;

a vertical low-pass filter for extracting a low-pass component of the image signal of the entire screen in a vertical direction; and second moving vector detecting means for detecting a moving vector in a horizontal direction of the image signal, by correlating each of the representative points with a pixel output from said vertical low-pass filter, having a horizontal component equal to each respective representative point for the predetermined period.

2. The moving vector detecting apparatus of claim 1 wherein said predetermined period is one frame period.

3. The moving vector detecting apparatus of claim 1 wherein said predetermined period is one field period.

4. A moving vector detecting apparatus in which moving vectors of an entire screen are detected from an amount of movement of a representative pixel in each of a plurality of blocks which comprise the entire screen in order to detect an amount of movement in a predetermined period, said moving vector detecting apparatus comprising:

vertical correlation detecting means for detecting vertical correlation for each of the plurality of blocks;

first moving vector detecting means for detecting a horizontal moving vector from one of the plurality of blocks, with high vertical correlation;

horizontal correlation detecting means for detecting horizontal correlation for each of the plurality of blocks; and second moving vector detecting means for detecting a vertical moving vector from one of the plurality of blocks with high horizontal correlation.

5. The moving vector detecting apparatus of claim 4 wherein said predetermined period is one frame period.

6. The moving vector detecting apparatus of claim 4 wherein said predetermined period is one field period.

7. A moving vector detecting apparatus in which moving vectors of an image are detected by detecting two intersecting one-dimensional moving vectors based on representative points in a plurality of blocks which comprise the image in order to detect an amount of movement for a predetermined period, wherein sampling timing for detecting the two intersecting one-dimensional moving vectors varies depending on a position of the representative points.

8. The moving vector detecting apparatus of claim 7 wherein the sampling timing for detecting a horizontal moving vector is obtained by offsetting the representative point by a vertical moving vector detected in a previous detection.

9. The moving vector detecting apparatus of claim 7 wherein the sampling timing for detecting a vertical moving vector is obtained by offsetting the representative point by a horizontal moving vector detected in a previous detection.

10. A moving vector detecting apparatus in which moving vectors of an entire screen are detected by detecting two intersecting one-dimensional moving vectors based on representative points in a plurality of blocks which comprise an image in order to detect an amount of movement of the image for a predetermined period, said moving vector detecting apparatus comprising:

a moving vector predictor for predicting present vertical and horizontal moving vectors from previously detected vertical and horizontal moving vectors, in which a horizontal moving vector is obtained by calculating a pixel on a horizontal straight line passing through a point which gives an offset of the predicted vertical moving vector to the representative point and a vertical moving vector is obtained by calculating a pixel on a vertical straight line passing through a point which gives an offset of the predicted horizontal moving vector to the representative point.

11. The moving vector detecting apparatus of claim 10 wherein a value obtained by averaging the previously detected moving vectors at a point in time is the predicted present moving vector when the previously detected moving vectors have numerous high frequency components higher than a prescribed frequency while a value predicted from moving vectors detected by the last three detections is the predicted present moving vector when the previously detected moving vectors have numerous low frequency components lower than the prescribed frequency.

12. The moving vector detecting apparatus of claim 11 wherein, when the moving vector detected by the last three detections is $V(t-1)$, $V(t-2)$, and $V(t-3)$, the predicted moving vector $V(t)$ is represented by:

$$V(t) = 3a \cdot V(t-1) - 3b \cdot V(t-2) + c \cdot V(t-3)$$

wherein a, b, and c are coefficients.

13. A moving vector detecting apparatus comprising:
vertical low-pass filter means for receiving and filtering a two-dimensional video signal to produce a vertically correlated video signal;
horizontal moving detector means for receiving the vertically correlated video signal and correlating a representative point for each of a plurality of blocks which comprise the two-dimensional video signal with a pixel from each of the plurality of blocks having a horizontal component equal to a horizontal component of each respective representative point, for a predetermined period to produce a horizontal moving vector;
horizontal low-pass filter means for receiving and filtering the two-dimensional video signal to produce a horizontally correlated video signal; and
vertical moving detector means for receiving the horizontally correlated video signal and correlating the representative point for each of the plurality of blocks with a pixel from each of the plurality of blocks having a vertical component equal to a vertical component of each respective representative point, for the predetermined period to produce a vertical moving vector.

14. An image blue apparatus including the moving vector detecting apparatus of claim 13.

15. A video camera including the image blue apparatus of claim 14.

16. The moving vector detecting apparatus of claim 15, further comprising:
two-dimensional detector means for determining movement of an image represented by the two-dimensional video signal by calculating a two-dimensional moving vector from the horizontal moving vector and the vertical moving vector.

17. The moving vector detecting apparatus of claim 15, further comprising:
two-dimensional low-pass filter means for filtering the two-dimensional video signal prior to receiving and filtering by said vertical and horizontal low-pass filter means;
wherein a vertical cut-off frequency of said vertical low-pass filter means is lower than a vertical cut-off frequency of said two-dimensional low-pass filter means and a horizontal cut-off frequency of said horizontal low-pass filter means is lower than a horizontal cut-off frequency of said two-dimensional low-pass filter means.

18. The moving vector detector of claim 15, said vertical moving detector means including,
vertical difference absolute value calculating means for calculating an absolute value of a difference between the representative point for each of the plurality of blocks in a previous frame and the pixel for each of the plurality of blocks in a present frame,
vertical accumulated addition table means for storing the absolute value of the difference calculated by said vertical difference absolute value calculating means, and
one-dimensional vector calculating means for calculating the vertical moving vector from the absolute value of the difference for each of the plurality of blocks stored in said vertical accumulated addition table means.

19. The moving vector detector apparatus of claim 15, wherein said horizontal low-pass filter means and said vertical low-pass filter means suppress a step change in dispersion of the horizontal and vertical moving vectors, respectively.

20. The moving vector detector of claim 15, wherein said horizontal and vertical moving detectors perform a time correlation.

21. The moving vector detector of claim 20, wherein said horizontal and vertical moving detectors perform an inter-frame correlation.

22. The moving vector detector of claim 20, wherein said horizontal and vertical moving detectors perform an inter-field correlation.

23. The moving vector detector of claim 15, said horizontal moving detector means including,
horizontal difference absolute value calculating means for calculating an absolute value of a difference between the representative point for each of the plurality of blocks in a previous frame and the pixel for each of the plurality of blocks in a present frame, horizontal accumulated addition table means for storing the absolute value of the difference calculated by said horizontal difference absolute value calculating means, and one-dimensional vector calculating means for calculating the horizontal moving vector from the absolute value of the difference for each of the plurality of blocks stored in said horizontal accumulated addition table means.

24. The moving vector detector apparatus of claim 23, wherein the absolute value of the difference for each of the plurality of blocks stored in said vertical accumulated addition table means is represented by:

$$Dy = \Sigma |R_{ij} - P_{ij}(0,y)|$$

where

Dy = the absolute value stored in said vertical accumulated addition table, $R_{ij}$ = the representative point for each of the plurality of blocks, and $P_{ij}(0,y)$ = the pixel for each of the plurality of blocks.

25. The moving vector detector apparatus of claim 23, wherein the absolute value of the difference for each of the plurality of blocks stored in said horizontal accumulated addition table means is represented by:

$$Dx = \Sigma |R_{ij} - P_{ij}(x,0)|$$

where

Dx = the absolute value stored in said horizontal accumulated addition table, $R_{ij}$ = the representative point for each of the plurality of blocks, and $P_{ij}(x,0)$ = the pixel for each of the plurality of blocks.

26. The moving vector detector apparatus of claim 25, wherein said one-dimensional vector calculating means selects an address x, where Dx is a minimum in order to maximize horizontal inter-frame correlation.

27. The moving vector detector apparatus of claim 25, wherein said one-dimensional vector calculating means selects an address y, where Dy is a minimum in order to maximize vertical inter-frame correlation.

28. A moving vector detector apparatus, comprising input means for receiving a image;

representative point means for determining a representative point for each of a plurality of blocks which comprise the image, for a predetermined period;

horizontal correlation detecting means for detecting a horizontal correlation value for each of the plurality of blocks;

vertical correlation detecting means for detecting a vertical correlation value for each of the plurality of blocks;

horizontal vector detecting means for selecting one of the plurality of blocks with a vertical correlation value greater than a predetermined vertical value and correlating a pixel of the image with the representative point for each of the plurality of blocks to produce a horizontal moving vector; and vertical vector detecting means for selecting one of the plurality of blocks with a horizontal correlation value greater than a predetermined horizontal value and correlating a pixel of the image with the representative point for each of the plurality of blocks to produce a vertical moving vector.

29. An image blur apparatus including the moving vector detecting apparatus of claim 28.

30. A video camera including the image blue apparatus of claim 29.

31. The moving vector detecting apparatus of claim 30, further comprising:

two-dimensional detector means for determining movement of the image by calculating a two-dimensional moving vector from the horizontal moving vector and the vertical moving vector.

32. The moving vector detecting apparatus of claim 30, further comprising:

two dimensional low-pass filter means for filtering the image prior to receiving by said input means.

33. The moving vector detector apparatus of claim 30, wherein said horizontal and vertical correlation detecting means suppress a steep change in dispersion of the horizontal and vertical moving vectors, respectively.

34. The moving vector detector of claim 30, said vertical correlation detecting means including, vertical difference absolute value calculating means for calculating an absolute value of a difference between a value of a pixel in a previous frame and a value of the pixel in a present frame for each of the plurality of blocks, vertical correlation accumulated addition table means for storing the absolute value of the difference for each of the plurality of blocks, vertical correlation judging means for comparing the absolute value of the difference for each of the plurality of blocks stored in said vertical correlation accumulated addition table with a predetermined value, and memory means for storing a result of the comparison made by said vertical correlation judging means as the vertical correlation value for each of the plurality of blocks.

35. The moving vector detecting apparatus of claim 24, wherein the absolute value of the difference for each of the plurality of blocks stored by said vertical correlation accumulated addition table means is represented by:

$$Dy_{ij} = \Sigma |P_{ij}(x,y) - P_{ij}(x,y-1)|$$

where $Dy_{ij}$ = the absolute value of the difference for each of the plurality of blocks, $P_{ij}(x,y)$ = the value of the pixel in the present frame, and $P_{ij}(x,y-1)$ = the value of the pixel in the previous frame.

36. The moving vector detector of claim 30, said horizontal correlation detecting means including, horizontal difference absolute value calculating means for calculating an absolute value of a difference between a value of a pixel in a previous frame and a value of the pixel in a present frame for each of the plurality of blocks, horizontal correlation accumulated addition table means for storing the absolute value of the difference for each of the plurality of blocks, horizontal correlation judging means for comparing the absolute value of the difference for each of the plurality of blocks stored in said horizontal correlation accumulated addition table with a predetermined value, and memory means for storing a result of the comparison made by said horizontal correlation judging means as the horizontal correlation value for each of the plurality of blocks.

37. The moving vector detecting apparatus of claim 36, wherein the absolute value of the difference for each of the plurality of blocks stored by said horizontal correlation accumulated addition table means is represented by:

$$Dx_{ij} = \Sigma |P_{ij}(x,y) - P_{ij}(x-1,y)|$$

where
$Dx_{ij}$ = the absolute value of the difference for each of the plurality of blocks,
$P_{ij}(x,y)$ = the value of the pixel in the present frame, and
$P_{ij}(x,y-1)$ = the value of the pixel in the previous frame.

38. The moving vector detector apparatus of claim 30, wherein said horizontal and vertical vector detecting means perform a time correlation.

39. The moving vector detector apparatus of claim 38, wherein said horizontal and vertical vector detecting means perform an inter-frame correlation.

40. The moving vector detector apparatus of claim 38, wherein said horizontal and vertical vector detecting means perform an inter-field correlation.

41. The moving vector detector apparatus of claim 30, said horizontal vector detecting means including,
horizontal difference absolute value calculating means for calculating an absolute value of a difference between the representative point for each of the plurality of blocks in a previous frame and the pixel for each of the plurality of blocks in a present frame,
horizontal block selecting means for outputting a value dependent on the horizontal correlation value and the absolute value for each of the plurality of blocks;
horizontal accumulation addition table means for storing the value output by said horizontal block selecting means, and
one-dimensional vector calculating means for calculating the horizontal moving vector from the value output for each of the plurality of blocks by said horizontal accumulation addition table means.

42. The moving vector detector apparatus of claim 41, wherein the value stored by said horizontal accumulation addition table means for each of the plurality of blocks is represented by:

$$\Delta x = \Sigma |R_{ij} - P_{ij}(x,0)|$$

where
$\Delta x$ = the value stored in said horizontal accumulation addition table means,
$R_{ij}$ = the representative point for each of the plurality of blocks, and
$P_{ij}(x,0)$ = the pixel for each of the plurality of blocks.

43. The moving vector detector apparatus of claim 42, wherein said one-dimensional vector calculating means selects an address of said horizontal accumulation addition table means, where $\Delta x$ is a minimum in order to maximize horizontal inter-period correlation.

44. The moving vector detector apparatus of claim 30, said vertical vector detecting means including,
vertical difference absolute value calculating means for calculating an absolute value of a difference between the representative point for each of the plurality of blocks in a previous frame and the pixel for each of the plurality of blocks in a present frame,
vertical block selecting means for outputting a value dependent on the vertical correlation value and the absolute value for each of the plurality of blocks;
vertical accumulation addition table means for storing the value output by said vertical block selecting means, and
one-dimensional vector calculating means for calculating the vertical moving vector from the value output for each of the plurality of blocks by said vertical accumulation addition table means.

45. The moving vector detector apparatus of claim 44, wherein the value stored by said vertical accumulation addition table means for each of the plurality of blocks is represented by:

$$\Delta y = \Sigma |R_{ij} - P_{ij}(0,y)|$$

where
$\Delta y$ = the value stored in said vertical accumulation addition table means,
$R_{ij}$ = the representative point for each of the plurality of blocks, and
$P_{ij}(0,y)$ = the pixel for each of the plurality of blocks.

46. The moving vector detector apparatus of claim 45, wherein said one-dimensional vector calculating means selects an address of said vertical accumulation addition table means, where $\Delta y$ is a minimum in order to maximize vertical inter-period correlation.

47. A moving vector detecting apparatus, comprising:
input means for receiving an image;
representative point means for determining a representative point for each of a plurality of blocks which comprise the image, for a predetermined period;
vertical comparative timing designating means for adding a horizontal offset to a pixel in a vertical direction from the representation point, for each of the plurality of blocks;
horizontal comparative timing designating means for adding a vertical offset to a pixel in a horizontal direction from the representative point, for each of the plurality of blocks;
vertical absolute value calculating means for calculating an absolute value of a difference between the representative point for each of the plurality of blocks in a previous frame and the horizontally offset pixel in a present frame;
horizontal absolute value calculating means for calculating an absolute value of a difference between the representative point for each of the plurality of blocks in a previous frame and the vertically offset pixel in a present frame;
vertical accumulated addition table means for storing the absolute value of the difference, for each of the plurality of blocks, calculated by said vertical absolute value calculating means;
horizontal accumulated addition table means for storing the absolute value of the difference, for each of the plurality of blocks, calculated by said horizontal absolute value calculating means; and
one-dimensional vector calculating means for calculating a horizontal moving vector and a vertical moving vector from the absolute values stored in said horizontal and vertical accumulated addition tables, respectively.

48. An image blue apparatus including the moving vector detecting apparatus of claim 47.

49. A video camera including the image blur apparatus of claim 48.

50. The moving vector detecting apparatus of claim 49, further comprising;

two-dimensional detector means for determining movement of the image by calculating a two-dimensional moving vector from the horizontal moving vector and the vertical moving vector.

51. The moving vector detector apparatus of claim 49, further comprising:

loop back means for setting the horizontal and vertical offsets for the image equal to the horizontal and vertical moving vectors calculated by said one-dimensional vector calculating means for a subsequent image.

52. The moving vector detector apparatus of claim 49, wherein the absolute value of the difference for each of the plurality of blocks stored in said horizontal accumulated addition table means is represented by:

$$Dx = \Sigma |R_{ij} - P_{ij}(x,0)|$$

where
- $Dx$ = the absolute value stored in said horizontal accumulated addition table,
- $R_{ij}$ = the representative point for each of the plurality of blocks, and
- $P_{ij}(x,0)$ = the pixel for each of the plurality of blocks.

53. The moving vector detector apparatus of claim 52, wherein said one-dimensional vector calculating means selects an address x, where Dx is a minimum in order to maximize horizontal inter-frame correlation.

54. The moving vector detector apparatus of claim 49, wherein the absolute value of the difference for each of the plurality of blocks stored in said vertical accumulated addition table means is represented by:

$$Dy = \Sigma |R_{ij} - P_{ij}(x,0)|$$

where
- $Dx$ = the absolute value stored in said vertical accumulated addition table,
- $R_{ij}$ = the representative point for each of the plurality of blocks, and
- $P_{ij}(x,0)$ = the pixel for each of the plurality of blocks.

55. The moving vector detector apparatus of claim 54, wherein said one-dimensional vector calculating means selects an address y, where Dy is a minimum in order to maximize vertical inter-frame correlation.

56. The moving vector detector apparatus of claim 49, further comprising:

horizontal moving vector predicting means for predicting a subsequent horizontal moving vector for a subsequent image and outputting the subsequent horizontal moving vector to said horizontal comparative timing designating means; and vertical moving vector predicting means for predicting a subsequent vertical moving vector predicting means for predicting a subsequent vertical moving vector for the subsequent image and outputting the subsequent vertical moving vector to said vertical comparative timing designating means.

57. The moving vector detector apparatus of claim 56, said horizontal moving vector predicting means including horizontal difference calculating means for calculating the subsequent horizontal moving vector utilizing the horizontal moving vector and a previous horizontal moving vector, and said vertical moving vector predicting means including vertical difference calculating means for calculating the subsequent vertical moving vector utilizing the vertical moving vector and a previous vertical moving vector.

58. The moving vector detector apparatus of claim 57, wherein the subsequent horizontal moving vector and the subsequent vertical moving vector are represented by:

$$v(t) = 2a \cdot V(t-1) - b \cdot V(t-2)$$

where
- $V(t)$ = the subsequent horizontal and vertical moving vectors,
- $V(t-1)$ = the horizontal and vertical moving vectors,
- $V(t-2)$ = the previous horizontal and vertical moving vectors, and
- a,b = coefficients.

59. The moving vector detector apparatus of claim 56, said horizontal moving vector predicting means including horizontal low-pass filtering means for calculating the subsequent horizontal moving vector utilizing the horizontal moving vector and a previous moving vector, and said vertical moving vector predicting means including vertical low-pass filtering means for calculating the subsequent vertical moving vector utilizing the vertical moving vector and a previous moving vector.

60. The moving vector detector apparatus of claim 59, wherein the subsequent horizontal moving vector and the subsequent vertical moving vector are represented by:

$$V(t) = 3a \cdot V(T-1) - 3b \cdot V(t-2) + c \cdot V(t-3)$$

where
- $V(t)$ = the subsequent horizontal and vertical moving vectors,
- $V(t-1)$ = the horizontal and vertical moving vectors,
- $V(t-2)$ and $V(t-3)$ = the two previous horizontal and vertical moving vectors, and
- a, b, and c = coefficients.

* * * * *

UNITED STATES PATENT AND TRADEMARK OFFICE
CERTIFICATE OF CORRECTION

PATENT NO. : 5,319,456
DATED : June 7, 1994
INVENTOR(S) : Nishida, et al.

It is certified that error appears in the above-indentified patent and that said Letters Patent is hereby corrected as shown below:

Col. 26, line 5, delete "blue" and insert --blur--.

Col. 26, line 7, delete "blue" and insert --blur--.

Col. 28, line 3, delete "blue" and insert --blur--.

Col. 28, line 40, delete "24" and insert --34--.
Col. 28, line 45, delete "$Dy_{ij}$" and insert --$\Delta y_{ij}$--.
Col. 28, line 48, delete "$Dy_{ij}$" and insert --$\Delta y_{ij}$--.
Col. 29, line 11, delete "$Dx_{ij}$" and insert --$\Delta x_{ij}$--.
Col. 29, line 14, delete "$Dx_{ij}$" and insert --$\Delta x_{ij}$--.
Col. 31, line 4, delete "blue" and insert --blur--.

Col. 13, Line 68, delete "$Dy_{ij}$" and insert --$\Delta y_{ij}$--

Signed and Sealed this

Fourth Day of July, 1995

Attest:

BRUCE LEHMAN

Attesting Officer          Commissioner of Patents and Trademarks